US012362573B2

(12) United States Patent
Ma et al.

(10) Patent No.: US 12,362,573 B2
(45) Date of Patent: Jul. 15, 2025

(54) POWER INVERTER ASSEMBLY AND METHOD OF PROVIDING POWER INVERTER ASSEMBLY

(71) Applicant: YASKAWA AMERICA INC., Waukegan, IL (US)

(72) Inventors: Jihua Ma, North Reading, MA (US); Chris Royer, Candia, NH (US); Michael Zuercher, West Newbury, MA (US); Miles C. Russell, Lincoln, MA (US)

(73) Assignee: YASKAWA AMERICA, INC., Waukegan, IL (US)

( * ) Notice: Subject to any disclaimer, the term of this patent is extended or adjusted under 35 U.S.C. 154(b) by 100 days.

(21) Appl. No.: 18/242,785

(22) Filed: Sep. 6, 2023

(65) Prior Publication Data
US 2024/0088672 A1 Mar. 14, 2024

Related U.S. Application Data

(60) Provisional application No. 63/406,434, filed on Sep. 14, 2022.

(51) Int. Cl.
H02J 3/46 (2006.01)
H02J 3/32 (2006.01)
H02M 1/00 (2007.01)
H02M 7/44 (2006.01)

(52) U.S. Cl.
CPC ............... *H02J 3/46* (2013.01); *H02J 3/32* (2013.01); *H02M 1/0067* (2021.05); *H02M 7/44* (2013.01); *H02J 2300/24* (2020.01)

(58) Field of Classification Search
CPC ...... H02J 3/46; H02J 3/32; H02J 3/381; H02J 2300/24; H02J 2300/26; H02M 1/0067; H02M 7/44
See application file for complete search history.

(56) References Cited

U.S. PATENT DOCUMENTS

2016/0329716 A1* 11/2016 Inoue ................. H02M 7/44
2017/0187191 A1* 6/2017 Kojima ................. H02J 3/46

* cited by examiner

*Primary Examiner* — Jeffrey M Shin
(74) *Attorney, Agent, or Firm* — MORI & WARD, LLP

(57) ABSTRACT

A power inverter assembly including first and second power inverter units configured to receive power from at least one energy source, and a portable structural platform to support the units. The units each have a terminals for connection to an electric power system, a solar panel arrangement, and a DC energy storage subsystem. The units are coupled to the platform. The first unit has a first pre-set AC power rating having a first maximum AC power output value for output to the power system and the second unit has a second pre-set AC power rating having a second maximum AC power output value for output to the power system to provide the assembly with a total maximum power output rating based on a combined total of the first and second pre-set AC power ratings. The energy source can include the power system, the solar panel arrangement, and the storage subsystem.

20 Claims, 13 Drawing Sheets

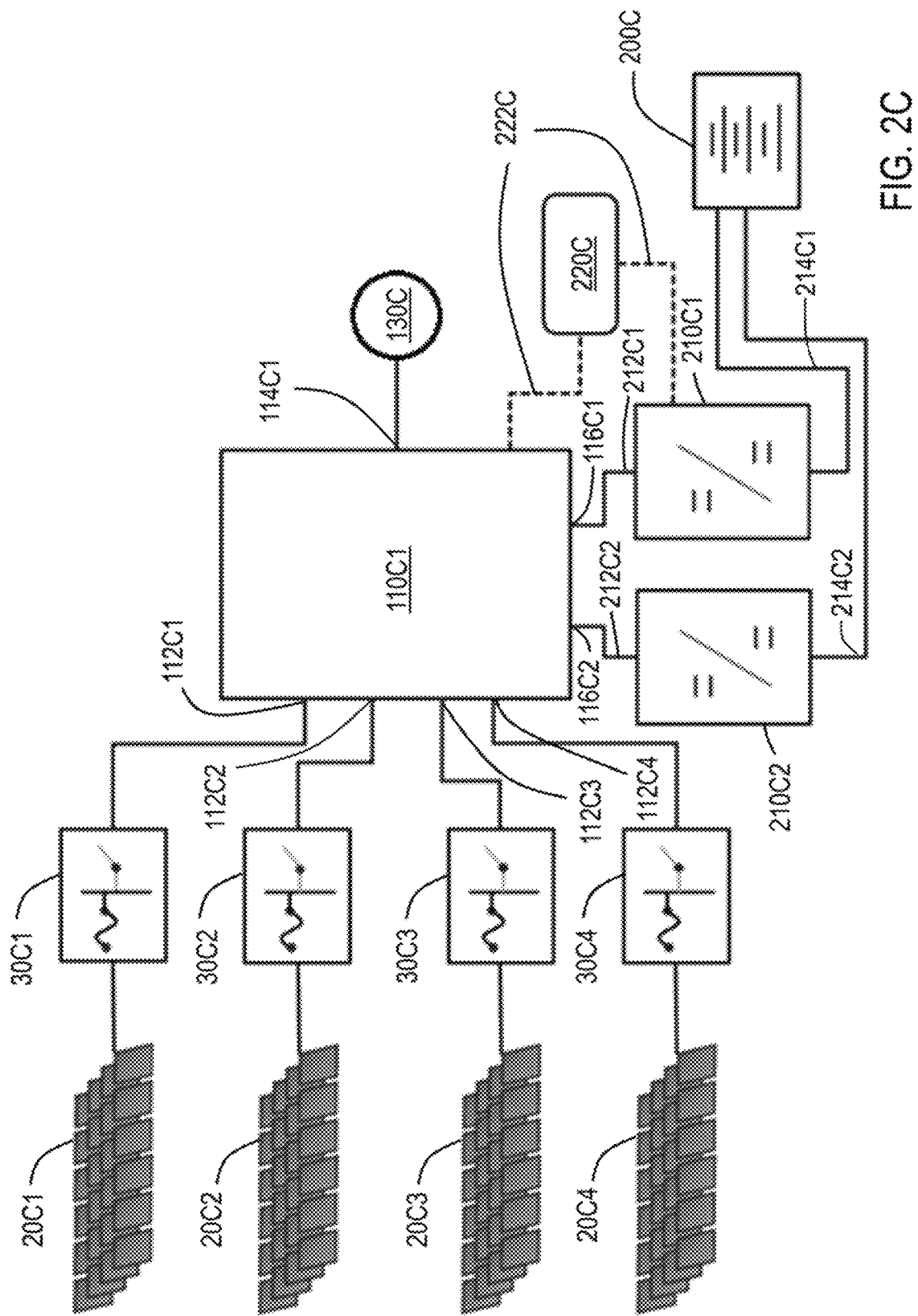

POWER INVERTER ASSEMBLY AND METHOD OF PROVIDING POWER INVERTER ASSEMBLY

CROSS-REFERENCE TO RELATED APPLICATION

The present application is non-provisional utility patent application that claims priority to U.S. Provisional Application No. 63/406,434, filed on Sep. 14, 2022, the entire contents of which are herein incorporated by reference.

BACKGROUND OF THE INVENTION

Field of the Invention

The present invention relates to power inverter assemblies that can be connected to an electric power system and methods of providing power inverter assemblies.

Discussion of the Background

The solar market in the United State of America is generally divided into three main segments: Residential, Commercial, and Utility. These segments are distinguished by a maximum allowable DC voltage of a photovoltaic (PV) array as established by the National Electrical Code. Residential PV arrays are limited to 600 Vdc, Commercial PV arrays are limited to 1,000 Vdc, and ground-mounted Utility PV arrays are limited to 1,500 Vdc.

There are two classes of 1500V DC/AC inverters used in the Utility market, namely, String Inverters and Central Inverters. A String Inverter is generally characterized by the inverter's power rating, which range between about 100 kWac and 350 kWac. A String Inverter is also typically secured to a rack or other structure in the field, with the String Inverter positioned at a convenient working height for persons installing and maintaining the String Inverter. Another characteristic of a String Inverter of the power-ratings described, is modularity, allowing PV system projects to include one or more String Inverters, each provided separately with its own dedicated PV array, to achieve a desired overall project size. The trend in recent years for String Inverters has been higher and higher rated power, while still preserving the basic modular characteristics of this class of inverters. The cost of the String Inverter is generally too high to compete for larger multi-MW PV projects, where lower-cost, higher-power Central Inverters are typically deployed.

A Central Inverter typically has a rating between about 1.5 MWac and 3.6 MWac, and includes a large monolithic enclosure. The market trend for a Central Inverter over the past five years has also been to achieve higher and higher rated power. A Central Inverter is typically mounted on a pad and moved into position using suitable heavy-duty lifting or hoisting equipment. The advantage of the Central Inverter is low cost, making them the most economical option for the large utility projects. A Central Inverter today comes in a fixed power rating, and manufacturers typically offer multiple models at varied power rating.

SUMMARY OF THE INVENTION

The present disclosure advantageously provides a power inverter assembly including a first power inverter unit configured to receive power from at least one energy source, a second power inverter unit configured to receive power from the at least one energy source, and a portable structural platform configured to support the first power inverter unit and the second power inverter unit. The first power inverter unit has a first-first terminal for connection to an electric power system to supply the power to the electric power system, a first-second terminal for connection to one or more solar panel arrangement, and a first-third terminal for connection to one or more DC energy storage subsystem. The second power inverter unit has a second-first terminal for connection to the electric power system to supply the power to the electric power system, a second-second terminal for connection to the one or more solar panel arrangement, and a second-third terminal for connection to the one or more DC energy storage subsystem. The first power inverter unit and the second power inverter unit each being coupled to the portable structural platform. The first power inverter unit has a first pre-set AC power rating having a first maximum AC power output value for output to the electric power system and the second power inverter unit has a second pre-set AC power rating having a second maximum AC power output value for output to the electric power system in order to provide the power inverter assembly with a total maximum power output rating based on a combined total of the first pre-set AC power rating and the second pre-set AC power rating. The at least one energy source is one or more energy source including: the electric power system; the one or more solar panel arrangement; and the one or more DC energy storage subsystem.

The present disclosure advantageously provides a method of providing a power inverter assembly that includes providing a first power inverter unit configured to receive power from at least one energy source, and providing a second power inverter unit configured to receive power from the at least one energy source. The first power inverter unit has a first-first terminal for connection to an electric power system to supply the power to the electric power system, a first-second terminal for connection to one or more solar panel arrangement, and a first-third terminal for connection to one or more DC energy storage subsystem. The second power inverter unit has a second-first terminal for connection to the electric power system to supply the power to the electric power system, a second-second terminal for connection to the one or more solar panel arrangement, and a second-third terminal for connection to the one or more DC energy storage subsystem. The method further includes coupling the first power inverter unit and the second power inverter unit to a portable structural platform configured to support the first power inverter unit and the second power inverter unit. The first power inverter unit has a first pre-set AC power rating having a first maximum AC power output value for output to the electric power system and the second power inverter unit has a second pre-set AC power rating having a second maximum AC power output value for output to the electric power system in order to provide the power inverter assembly with a total maximum power output rating based on a combined total of the first pre-set AC power rating and the second pre-set AC power rating.

The present disclosure advantageously provides a method of providing a power inverter assembly including selecting a plurality of power inverter units that provide the power inverter assembly with a total maximum power output rating based on a combined total of pre-set AC power ratings of the selected plurality of power inverter units, and coupling the selected plurality of power inverter units to a portable structural platform. The selected plurality of power inverter units each have: a first terminal for connection to an electric power system to supply power to an electric power system, a second terminal for connection to one or more solar panel arrangement, and a third terminal for connection to one or more DC energy storage subsystem.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings described below.

FIG. 2C is a schematic diagram of a power inverter unit of the power inverter assembly shown connected as a DC-coupled storage system configuration including photovoltaic arrays and an energy storage subsystem.

DETAILED DESCRIPTION OF EXEMPLARY EMBODIMENTS OF THE INVENTION

Figure 1:
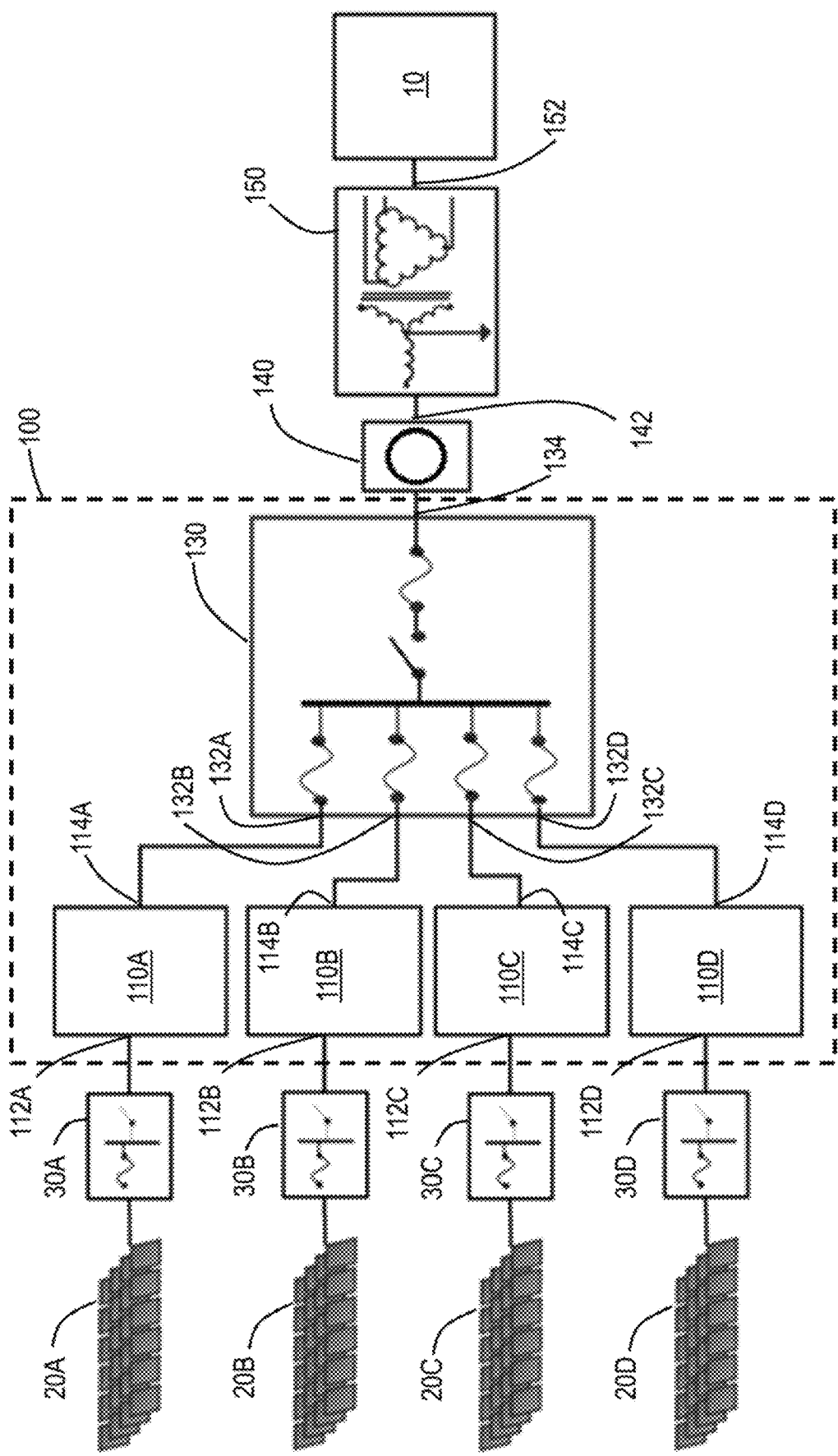
FIG. 1 is a schematic diagram of an embodiment of a power inverter assembly connected between an electric power system and solar panel arrangements.

Embodiments of the present invention will be described hereinafter with reference to the accompanying drawings. In the following description, the constituent elements having substantially the same function and arrangement are denoted by the same reference numerals, and repetitive descriptions will be made only when necessary.

The present disclosure relates to power inverter assemblies that can be connected to an electric power system and methods of providing power inverter assemblies. Such power inverter assemblies can be connected to a photovoltaic (PV) power generating system(s), as well as to a DC energy storage subsystem(s).

The disclosure provides scalable power inverter assemblies that can allow for configuration flexibility for photovoltaic power generating systems used with such power inverter assemblies. The power inverter assemblies can utilize two or more inverters (also referred to herein as power inverters, inverter units, or power inverter units), for example, inverters having pre-set AC power ratings of 1 MW, 0.85 MW, 0.75 MW, etc., to provide a desired total maximum power output rating based on a combined total of pre-set AC power ratings of the two or more inverters.

The disclosure advantageously provides a power inverter assembly with sizing flexibility for large PV systems, and overall system operational configuration flexibility, and thereby provides a flexible solution for PV system designers and installers with various implementation possibilities. Such power inverter assemblies provide significant flexibility in system configuration and can provide cost savings for a consumer.

The present disclosure provide a power inverter assembly that can operate in the 1500V class. This power inverter assembly is scalable such that multiple inverters (e.g., 1 MW inverters, 0.85 MW inverters, 0.75 MW inverters, etc., or a mix thereof) can be factory pre-assembled to a portable structural platform (e.g., supporting skid), pre-wired and tested, providing an assembly of inverters with a total maximum power output rating, for example, 1.5 MW or higher. Such power inverter assemblies including such a portable structural platform can advantageously provide a factory-delivered power inverter assembly with total maximum power output ratings equivalent to the Central Inverter class of the Utility segment of the solar market, and that can be incremented starting at, for example, 1.5 MW, and incremented or stepped-up in power, in even or uneven upward steps. Thus, the power inverter assembly of the present disclosure provides advantages in scalability and size flexibility, as well as portability.

The power inverter assembly can be pre-assembled to a portable structural platform (supporting skid, mounting surface), pre-wired and tested in the factory, to provide a power inverter assembly with an overall power rating that can match the needs of the customer. The power inverter assembly can also include a factory-wired AC combiner, with overcurrent protection for AC outputs from each power inverter unit. The power inverter assembly is a factory-delivered assembly that can achieve power increments on a single portable structural platform. Such assemblies can exceed the power output rating of the highest rated Central Inverter in the market today. The power inverter assembly is ideally suited for the multi-MW utility market segment, providing unprecedented flexibility in power rating as a building block for the largest PV arrays. Each power inverter unit is configured inside with terminations (terminals) for various inputs that can be used for any of a variety of configurations: straight PV system configuration (see, e.g., FIGS. 1, 2A, and 4); AC-coupled storage system configuration (see, e.g., FIGS. 2B and 4); and DC-coupled storage system configuration (see, e.g., FIGS. 2C and 4). Each power inverter unit is preferably provided with one or more terminal for connection to an electric power system to supply the power to the electric power system, one or more terminal for connection to one or more solar panel arrangement, and one or more terminal for connection to one or more DC energy storage subsystem, even if such terminals, in some of the power inverter units, are not connected to such devices in each configuration.

FIG. 1 is a schematic diagram of an embodiment of a power inverter assembly 100 connected between an electric power system 10 (e.g., power grid) and solar panel arrangements 20A, 20B, 20C, 20D. The solar panel arrangements can be one or more solar panels, or one or more solar panel arrays. The power inverter assembly 100 shown in FIG. 1 includes four power inverter units 110A, 110B, 110C, 110D; however, the power inverter assembly can be configured with two or more power inverter units depending upon the desired total maximum power output rating of the power inverter assembly.

Each solar panel arrangement 20A, 20B, 20C, 20D is respectively connected to PV combiners 30A, 30B, 30C, 30D, which are respectively connected to input terminals 112A, 112B, 112C, 112D of respective power inverter units 110A, 110B, 110C, 110D. Each power inverter unit 110A, 110B, 110C, 110D has a respective terminal 114A, 114B, 114C, 114D connected to respective terminals 132A, 132B, 132C, 132D of AC combiner 130. The AC combiner 130 has a terminal 134 connected to AC meter 140, such as an AC kWh meter. The AC meter 140 has a terminal 142 connected to transformer 150, and the transformer 150 has a terminal 152 connected to the electric power system 10.

When configured as plurality power inverter units on a factory-assembled portable structural platform or "skid." each power inverter unit can operate independently of the other power inverter units on the skid. Because of their autonomous and independent operation, if a single power inverter unit fails, that does not impact any of the other power inverter units, and leaves the other power inverter units fully operable.

When configured as a power inverter assembly, each power inverter unit can be easily accessed for routine maintenance and service, as required. The majority of routine inspection tasks and typical service work can be completed working entirely from the front-side of the power inverter units (see FIGS. 5C and 6-8), which face outward and thereby provide unfettered accessibility.

Figure 2A:
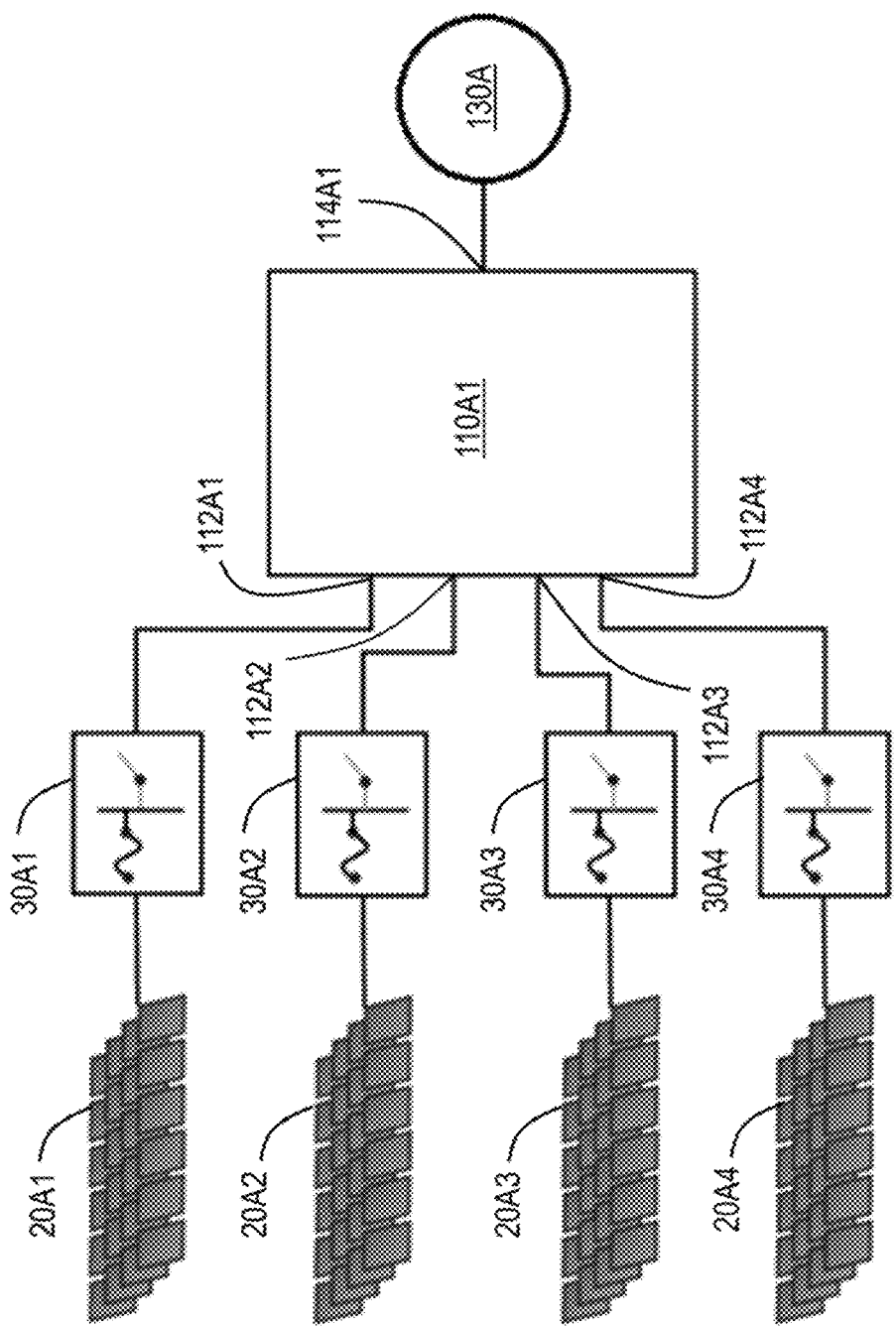
FIG. 2A is a schematic diagram of a power inverter unit of the power inverter assembly shown in connection to a photovoltaic system configuration including photovoltaic arrays.
Figure 2B:
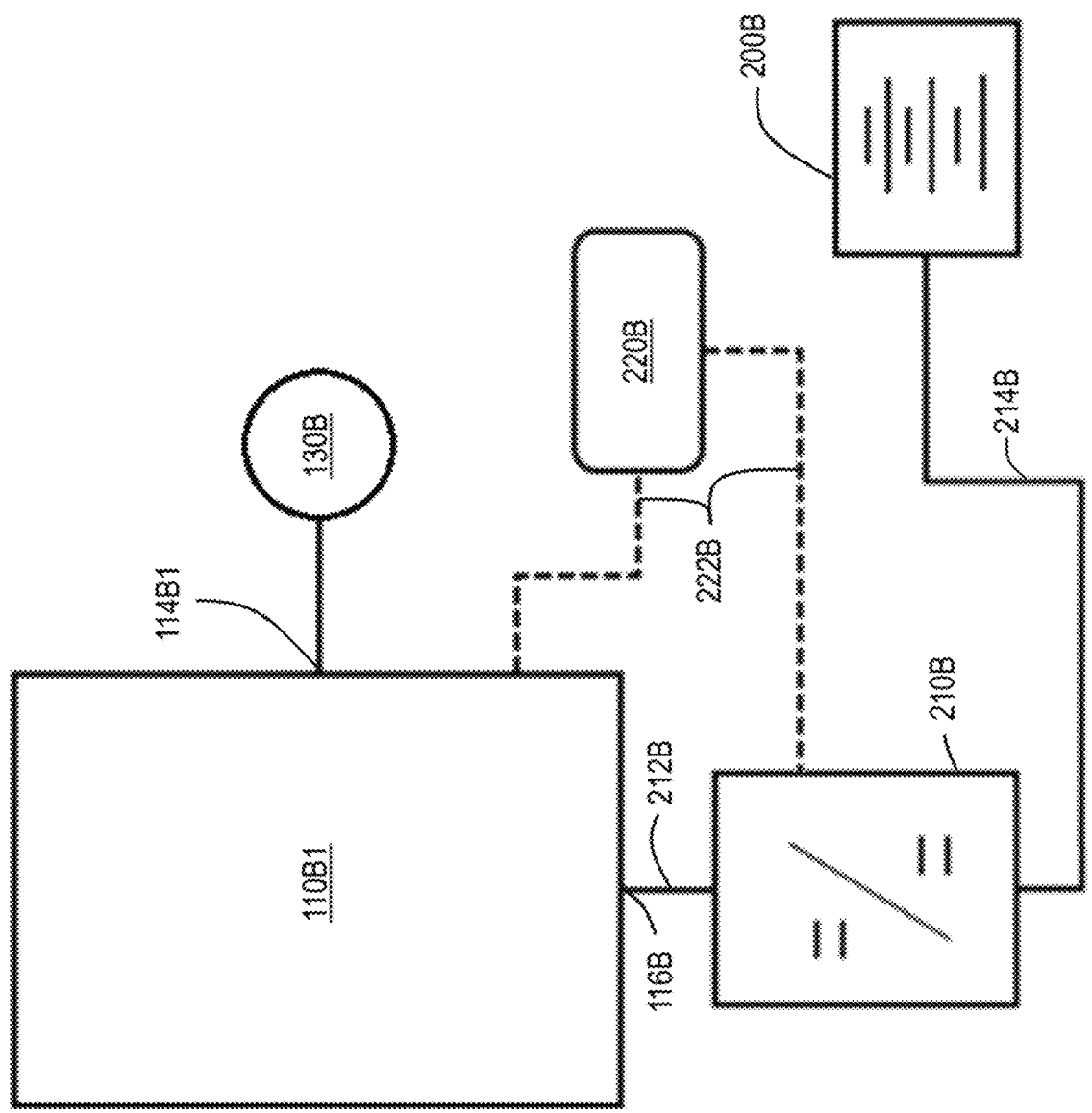
FIG. 2B is a schematic diagram of a power inverter unit of the power inverter assembly shown connected as an AC-coupled storage system configuration including an energy storage subsystem.

Each power inverter unit is equipped with wiring terminal(s) for connection to the electric power system, wiring terminal(s) for connection to DC input from one or more solar panel arrangements (e.g., PV solar array(s)), and also wiring terminal(s) for connection to a DC energy storage subsystem, as will be explained with respect to the different configurations shown in FIGS. 2A-2C. FIGS. 2A-2C show exemplary power inverter units set up to operate in various configurations.

FIG. 2A is a schematic diagram of a power inverter unit 110A1 of the power inverter assembly shown in connection to a photovoltaic system configuration including photovoltaic arrays. FIG. 2B is a schematic diagram of a power inverter unit 110B1 of the power inverter assembly shown connected as an AC-coupled storage system configuration including an energy storage subsystem. FIG. 2C is a schematic diagram of a power inverter unit 110C1 of the power inverter assembly shown connected as a DC-coupled storage system configuration including photovoltaic arrays and an energy storage subsystem.

FIG. 2A shows a power inverter unit 110A1 in connection to a solar panel arrangement, such as a photovoltaic system configuration including four photovoltaic arrays. As noted above, each power inverter unit can be equipped with wiring terminal(s) for connection to one or more solar panel arrangements (e.g., PV solar array(s)). The solar panel arrangements can be one or more solar panels, or one or more solar panel arrays. In the embodiment shown in FIG. 2A, the power inverter unit 110A1 is connected to four solar panel arrangements 20A1, 20A2, 20A3, 20A4. Each solar panel arrangement 20A1, 20A2, 20A3, 20A4 is respectively connected to PV combiners 30A1, 30A2, 30A3, 30A4, which arc respectively connected to input terminals 112A1, 112A2, 112A3, 112A4 of the power inverter unit 110A1. The power inverter unit 110A1 has a terminal 114A1 for connection to the remaining system 130A, for example, the terminal 114A1 could be connected to a terminal of an AC combiner, such as AC combiner 130 in FIG. 1.

FIG. 2B shows a power inverter unit 110B1 of the power inverter assembly shown connected as an AC-coupled storage system configuration including an energy storage subsystem 200B. The energy storage subsystem 200B can include one or more battery storage units. In the embodiment shown in FIG. 2B, the power inverter unit 110B1 is connected to the energy storage subsystem 200B via a DC-DC converter 210B. The power inverter unit 110B1 has a terminal 116B that is connected to a connection line 212B that connects to the DC-DC converter 210B, and the DC-DC converter 210B is connected to the energy storage subsystem 200B via connection line 214B. In addition, the DC-DC-converter 210B is connected to a controller 220B and a controller (see discussion of FIG. 3 below) of the power inverter unit 110B1 via signal lines 222B. The power inverter unit 110B1 has a terminal 114B1 for connection to the remaining system 130B, for example, the terminal 114B1 could be connected to a terminal of an AC combiner (such as AC combiner 130 in FIG. 1).

The controller 220B is a physical piece of hardware that serves as a hub for site communication. The controller 220B has a switch and is monitoring and communicating to other components in the system, such as the DC-DC converter(s) and the power inverter unit.

In the configuration shown in FIG. 2B in which the power inverter unit 110B1 is connected to the electric power system via the remaining system 130B, the power inverter unit 110B1 provides an AC-coupled storage system configuration. In the AC-coupled storage system configuration, the power inverter unit 110B can be used as a battery inverter, with no input from a solar panel arrangement. The power inverter unit 110B1 of the power inverter assembly can operate bi-directionally, to charge batteries of the energy storage subsystem 200B from the grid (i.e., electric power system 10 in FIG. 1), and also discharge the batteries of the energy storage subsystem 200B through the power inverter unit 110B1 of the power inverter assembly into the grid. When configured as a power inverter assembly, any or all of the power inverter units can be configured in an AC-coupled storage system configuration. That is, none, one or all of the power inverter units on a skid can be configured as an AC-coupled storage system. When one or more power inverter units are configured for AC-coupled storage, this has no impact on the performance of the other power inverter units in the power inverter assembly that are not configured for AC-coupled storage.

It is noted that a power inverter assembly could be provided with two or more power inverter units having the AC-coupled storage system configuration shown in FIG. 2B and no power inverter unit is provided in connection with a solar panel arrangement. Thus, it is possible to have an entire power inverter assembly with power inverter units being used in an AC-coupled configuration, with no PV array.

FIG. 2C shows a power inverter unit 110C1 of the power inverter assembly shown connected as a DC-coupled storage system configuration including an energy storage subsystem 200C and a solar panel arrangement, such as a photovoltaic system configuration including one or more photovoltaic arrays. In the embodiment shown in FIG. 2C, the power inverter unit 110C1 is connected to four solar panel arrangements 20C1, 20C2, 20C3, 20C4. Each solar panel arrangement 20C1, 20C2, 20C3, 20C4 is respectively connected to PV combiners 30C1, 30C2, 30C3, 30C4, which are respectively connected to input terminals 112C1, 112C2, 112C3, 112C4 of the power inverter unit 110C1. The power inverter unit 110C1 has a terminal 114C1 for connection to the remaining system 130C, for example, the terminal 114C1 could be connected to a terminal of an AC combiner, such as AC combiner 130 in FIG. 1.

In the embodiment shown in FIG. 2C, the power inverter unit 110C1 is connected to the energy storage subsystem 200C via two DC-DC converters, namely, a DC-DC converter 210C1 and a DC-DC converter 210C2. The power inverter unit 110C1 has a terminal 116C1 that is connected to a connection line 212C1 that connects to the IDC-DC converter 210C, and the DC-DC converter 210C1 is connected to the energy storage subsystem 200C via connection line 214C1. In addition, the DC-DC-converter 210C1 is connected to a controller 220C and a controller (see discussion of FIG. 3 below) of the power inverter unit 110C1 via signal lines 222C. Additionally, the power inverter unit 110C1 has a terminal 116C2 that is connected to a connection line 212C2 that connects to the DC-DC converter 210C2, and the DC-DC converter 210C2 is connected to the energy storage subsystem 200C via connection line 214C2. DC-DC converter 210C2 is also connected to the controller 220C via signal lines (not shown in FIG. 2C).

In the configuration shown in FIG. 2C in which the power inverter unit 110C1 is connected to the electric power system via the remaining system 130C and to a solar panel arrangement, such as solar panel arrangements 20C1, 20C2, 20C3, 20C4, the power inverter unit 110C1 provides a DC-coupled storage system configuration. When configured as a power inverter assembly, any of the power inverter units can be configured with a DC-coupled storage system configuration. That is, none, one or all of the power inverter units on a skid can be configured as a IX-coupled storage system. When one or more power inverter units on a power inverter assembly are configured for DC-coupled storage, this has no impact on the performance of the other power inverter units on the power inverter assembly that are not configured for DC-coupled storage.

The configuration shown in FIG. 2C includes two DC-DC converters in parallel, namely, DC-DC converter 210C1 and DC-DC converter 210C2. The DC-DC converters shown in FIG. 2C, for example, can each be 500 kW DC-DC converters in order to make a combined 1 MW DC-DC converter configuration. However, the power inverter unit could alternatively be provided with a single full power DMX-converter, for example, as shown in FIG. 2B.

Utilizing the connections and configurations shown in FIGS. 2A-2C, a variety of different power inverter assemblies can be configured and operated in a variety of different manners or modes. It is noted that, depending upon the configuration and/or mode of operation, the power inverter unit(s) can be configured to receive power from one or more energy source including an electric power system (e.g., during charging of a DC energy storage system using power from an electrical power grid), one or more solar panel arrangement, and one or more DC energy storage subsystem.

The power inverter assembly can include two or more power inverter units (e.g., two, three, four, five, six, etc.) mounted on a portable structural platform. Each of the power inverter units would typically include a first terminal (see, e.g., terminal(s) 114A, 114B, 114C, 114D in FIG. 1; terminal 114A1 in FIG. 2A; terminal 114B1 in FIG. 2B; terminal 114C1 in FIG. 2C) for connection to an electric power system to supply the power to the electric power system, a second terminal (see. e.g., terminal(s) 112A, 112B, 112C, 112D in FIG. 1; terminal(s) 112A1, 112A2, 112A3, 112A4 in FIG. 2A; not shown in FIG. 2B for simplicity; terminal(s) 112C1, 112C2, 112C3, 112C4 in FIG. 2C) for connection to one or more solar panel arrangement, and a third terminal (see. e.g., not shown in FIG. 1 for simplicity; not shown in FIG. 2A for simplicity; terminal 116B in FIG. 2B; terminal(s) 116C1, 116C2 in FIG. 2C) for connection to one or more DC energy storage subsystem. The power inverter assembly would typically include an AC combiner connected to the power inverter units, and mounted on the portable structural platform. The power inverter assembly could also include a transformer connected to the AC combiner, and mounted on the portable structural platform, as well as an AC meter mounted on the portable structural platform. It is possible that the power inverter assembly could also include PV combiner(s) connected to the power inverter units, and mounted on the portable structural platform; however, typically such PV combiner(s) would not be provided as part of the power inverter assembly. In addition, it is possible that the power inverter assembly could also include energy storage subsystem(s) connected to the power inverter units (as well as any associated DC-DC converters and/or controllers), and mounted on the portable structural platform; however, typically such energy storage subsystem(s) would not be provided as part of the power inverter assembly.

Each of the power inverter unit includes a controller that controls and monitors components and systems of the power inverter unit, and that can report out any issues detected. The controller is programed (e.g., using firmware) to provide the power inverter unit with a specified pre-set AC power rating having a maximum AC power output value for output to the electric power system. In the factory, the power inverter units will be assembled and then the power inverter units will be loaded with the proper firmware and tested at its full power rating, and then the power inverter assembly will be assembled with a set of the power inverter units, each with its own such power rating. Alternatively, in the factory, the power inverter assembly could be assembled with each of the power inverter units, and, at the end of the assembly process, each power inverter unit will be loaded with the proper firmware, and tested at its full power rating. That firmware will be specific to the desired AC power rating (e.g., 0.75 MW, 0.85 MW, 1 MW, etc.). Each of the power inverter units will typically be provided with a rating label that will identify its key specifications including the rated power. The power inverter unit can be set to a reduced peak power level, generally a temporary setting, and such a change in setting can be done over-the-air or in the field. Thus, each power inverter unit has a first pre-set AC power rating having a first maximum AC power output value for output to the electric power system. The power ratings of the power inverter units provide the power inverter assembly with a total maximum power output rating based on the combined total of the first pre-set AC power rating and the second pre-set AC power rating, and so on for all power inverter units in the power inverter assembly.

In operation, it is noted that the actual power out of the power inverter unit varies based on available power input to the power inverter unit from the PV array, which varies from zero at dawn, to a peak typically at midday, and then back to zero at sunset. Thus, the pre-set AC power rating discussed herein is a pre-set (e.g., via firmware) maximum AC power output rating. The power inverter units each include a controller (see discussion of FIG. 3 below) with at least one processor programmed to provide the power inverter unit with a pre-set AC power rating. The total maximum power output rating of the power inverter assembly is the combined pre-set AC power ratings of all of the power inverter units in the power inverter assembly. Thus, the total maximum power output rating of the power inverter assembly is the maximum power output that the power inverter assembly can provide to the electric power system, as set by programming and capacity of the components of the power inverter units collectively, and as established as part of the safety certification listing of the power inverter unit.

Figure 3:
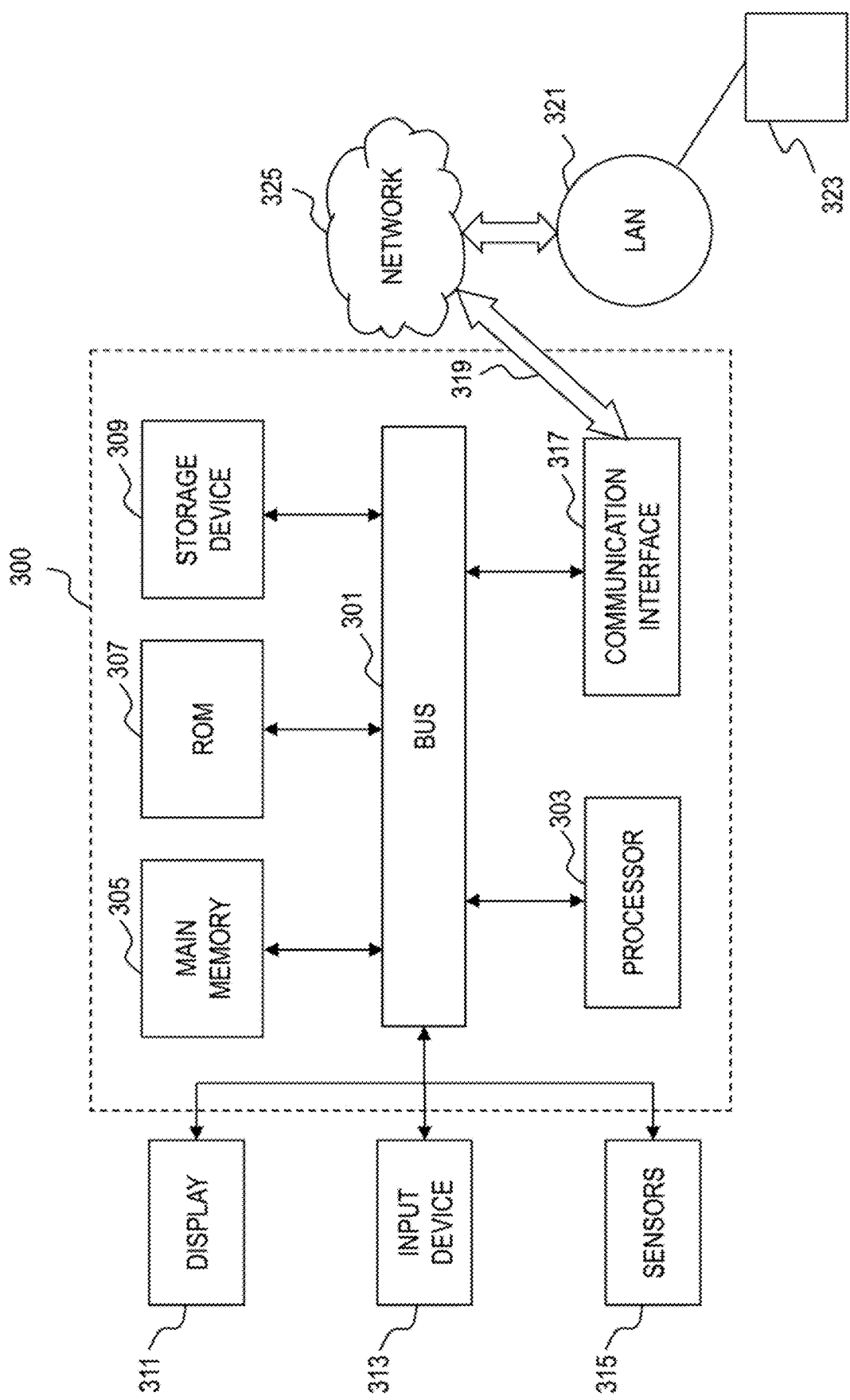
FIG. 3 illustrates an embodiment of a computer with which a power inverter unit of the power inverter assembly can be implemented.

Some or all of the configurations described and/or shown herein include a controller (e.g., controller(s) of power inverter unit(s); controller(s) of power inverter assemblies; controllers 220B, 220C, 520A, 520B), an embodiment of which can include a computer or computer system as shown in FIG. 3 that is programmed (e.g., via computer program code or instructions) to provide the functionality described herein and includes a communication mechanism such as a bus for passing information between other internal and external components of the computer system. It is noted that each power inverter unit includes such a controller, and the power inverter assembly could also be provided with such a controller to provide overall control of the power inverter assembly including the power inverter units and/or to control or monitor any of the components to which the power inverter unit(s) or the power inverter assembly is connected. In each such controller, one or more processors for processing information are coupled with the bus to perform a set of operations on information as specified by computer program code. The computer also includes a memory coupled to the bus. The memory, such as a random access memory (RAM) or other dynamic storage device, stores information including processor instructions. The memory is also used by the processor to store temporary values during execution of processor instructions. The computer system can also include a read only memory (ROM) or other static storage device coupled to the bus for storing static information, including instructions, that is not changed by the computer system. The computer can also include a communication interface that allows the computer to communicate with other devices or equipment (e.g., network elements, servers, etc.) Information, including user input instructions, is provided to the bus for use by the processor from a user interface, such as a keyboard containing alphanumeric keys operated by a human user, a display device, a pointing device (such as a mouse or a trackball or cursor direction keys).

FIG. 3 illustrates an embodiment of such a controller or computer 300 with which an embodiment of the invention may be implemented. Although computer 300 is depicted with respect to a particular device or equipment, it is contemplated that other devices or equipment (e.g., network elements, servers, etc.) within FIG. 3 can deploy the illustrated hardware and components of system 300. The controller 300 is programmed (e.g., via computer program code (e.g., firmware) or instructions) to provide the functionality described herein and includes a communication mechanism such as a bus 301 for passing information between other internal and external components of the controller 300. One or more processors 303 for processing information are coupled with the bus 301 to perform a set of operations on information as specified by computer program code.

The controller 300 also includes a memory 305 coupled to bus 301. The memory 305, such as a random access memory (RAM) or other dynamic storage device, stores information including processor instructions. The memory 305 is also used by the processor 303 to store temporary values during execution of processor instructions. The controller 300 also includes a read only memory (ROM) 307 or other static storage device coupled to the bus 301 for storing static information, including instructions, that is not changed by the controller 300. The controller 300 includes a communication interface 317 that allows the controller 300 to communicate with other devices or equipment (e.g., network elements 325, servers, LAN 312, computer 323, etc.) via wireless or wired communication link 319.

Information, including user/technician input instructions, is provided to the bus 301 for use by the processor 303 from a user/technician interface including a display 311 and an input device 313, such as a keyboard containing alphanumeric keys operated by a human user, a pointing device (such as a mouse or a trackball or cursor direction keys).

One or more sensors 315 can communicate with the processor 303 via the bus 301 in order to send and receive data, operating instructions/commands, or other information therebetween. The processor 303 can control operation of one or more power inverter unit using operating instructions/commands in order to control operational configurations/modes of the one or more power inverter unit.

Thus, the power inverter units each has an internal controller (or control system) that controls and/or monitors hardware of the power inverter unit. Each such controller monitors the internal workings of its components and systems, and reports out any issues detected. The controller of the power inverter unit is preferably able to both send and receive signals (transmission control protocol (tcp) over ethernet). The controller of the power inverter unit can operate autonomously, for example, by sensing whether grid conditions (voltage and frequency), and input conditions (from the solar array, open-circuit voltage) are within the normal and acceptable range to allow operation. The controller of the power inverter unit can be configured to allow users to remotely communicate with the power inverter unit, for example, to change the settings or mode of operation of the power inverter unit, and/or to download software (firmware) updates. Firmware updates can be done locally or via outside network (remotely) by wired communications or wireless communications. The power level of the power inverter units and/or the power inverter assembly can be curtailed via outside network.

A controller of one of the power inverter units of a power inverter assembly having plural power inverter units can be programmed to be a master controller that can communicate with and/or receive signals from control system on an outside network, and then communicate such information to each of the other power inverter units of the power inverter assembly. For example, in a DC-coupled storage configuration, a utility company might send signals to the power inverter assembly or the power inverter units commanding them to dispatch energy to the grid on some specific schedule.

Figure 4:
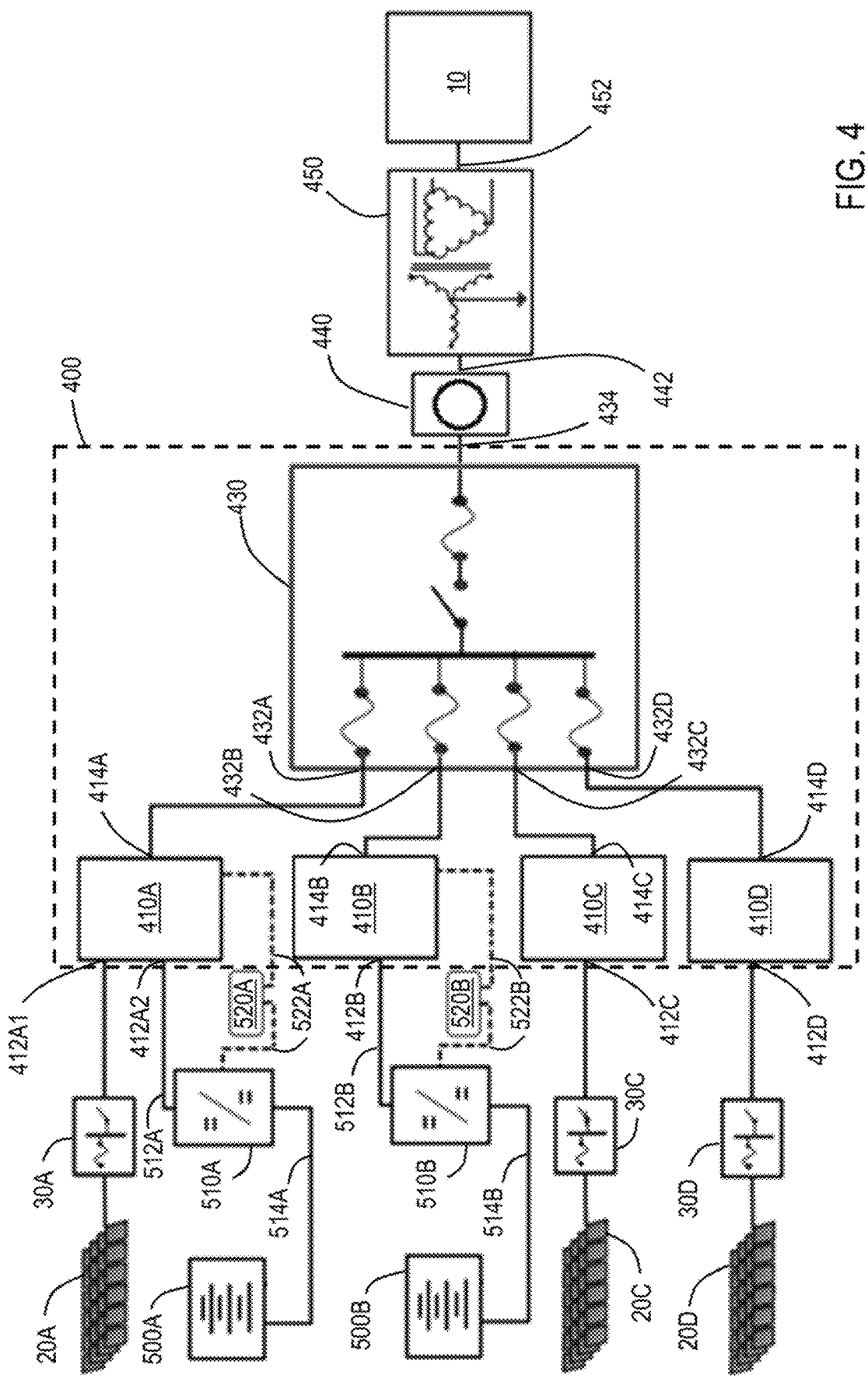
FIG. 4 is a schematic diagram of an additional embodiment of a power inverter assembly connected to an electric power system.

FIG. 4 shows a mixed-use power inverter assembly 400 with four power inverter units where one power inverter unit is configured as a DC-coupled storage (see power inverter unit 410A), one power inverter unit is configured with AC-coupled storage (see power inverter unit 410B), and two power inverter units are utilized with straight PV systems having photovoltaic arrays (see power inverter units 410C, 410D).

Power inverter assembly 400 is connected to an electric power system 10 (e.g., power grid). The power inverter assembly 400 shown in FIG. 4 includes four power inverter units 410A, 410B, 410C, 410D; however, the power inverter assembly can be configured with two or more power inverter units depending upon the desired total maximum power output rating of the power inverter assembly.

In FIG. 4, the solar panel arrangements 20A, 20C, 20D are respectively connected to PV combiners 30A, 30C, 30D, which are respectively connected to input terminals 412A1, 412C, 412D of respective power inverter units 410A, 410C, 410D. Each power inverter unit 410A, 410B, 410C, 410D has a respective terminal 414A, 414B, 414C, 414D connected to respective terminals 432A, 432B, 432C, 432D of AC combiner 430. The AC combiner 430 has a terminal 434 connected to AC meter 440, such as an AC kWh meter. The AC meter 440 has a terminal 442 connected to transformer 450, and the transformer 450 has a terminal 452 connected to the electric power system 10. An AC kWh may or may not be present in any configuration.

In the embodiment shown in FIG. 4, the power inverter unit 410A is connected to solar panel arrangement 20A. In addition, the power inverter unit 410A is connected to the energy storage subsystem 500A via a DC-DC converter 510A. The power inverter unit 410A has a terminal 412A2 that is connected to a connection line 512A that connects to the DXC-DC converter 510A, and the DC-DC converter 510A is connected to the energy storage subsystem 500A via connection line 514A. In addition, the DC-DC-converter 510A is connected to a controller 520A and a controller (see discussion of FIG. 3 above) of the power inverter unit 410A via signal lines 522A.

In the embodiment shown in FIG. 4, the power inverter unit 410B is connected to the energy storage subsystem 500B via a DC-DC converter 510B. The power inverter unit 410B has a terminal 412B that is connected to a connection line 512B that connects to the DC-DC converter 510B, and the DC-DC converter 510B is connected to the energy storage subsystem 500B via connection line 514B. In addition, the DC-DC-converter 510B is connected to a controller 520B and a controller (see discussion of FIG. 3 above) of the power inverter unit 410B via signal lines 522B.

It is noted that the power inverter unit 410A of the power inverter assembly 400 can be operated either as an AC-coupled storage system configuration in which energy from the electric power source 10 is stored utilizing the energy storage subsystem 500A or as a IX-coupled storage system configuration in which energy from the solar panel arrangements 20A is stored utilizing the energy storage subsystem 500A. It is noted that the power inverter unit 410B of the power inverter assembly 400 can be operated as an AC-coupled storage system configuration in which energy from the electric power source 10 is stored utilizing the energy storage subsystem 500B.

The power inverter units of the power inverter assembly 400 can be operated in various modes depending upon their configurations (i.e., whether or not the power inverter unit is connected to a solar panel arrangement or to an energy storage subsystem) by control of their respective controller (e.g., controller 300 in FIG. 3) including at least one processor programmed to set a selected power inverter unit to various modes. For example, power inverter unit 410A can be set to: a first mode in which the power inverter unit 410A is configured to receive power from solar panel arrangement 20A and supply the power to the electric power system 10; a second mode in which the power inverter unit 410A is configured to receive the power from the solar panel arrangement 20A and supply the power to the energy storage subsystem 500A; a third mode in which the power inverter unit 410A is configured to receive the power from the energy storage subsystem 500A and supply the power to the electric power system 10; and a fourth mode in which the power inverter unit 410A is configured to receive the power from the electric power system 10 and supply the power to the energy storage subsystem 500A.

Thus, depending on system needs, the power inverter unit 410A can actively switch between the first mode, the second mode, the third mode, and the fourth mode. The solar panel arrangement (e.g., PV array) may be capable of producing far greater power than the power inverter unit it is connected to can handle. When this is the case, the controller of the power inverter unit can adjust an operating point for the PV array, to move it off its max power point, and to a lower power level that the inverter is capable of handling. That "missed" power and energy can be automatically diverted to the energy storage subsystem 500A, when those conditions arise. This process is referred to as "clipping" or "clipped energy" recovery. The inverter gets the maximum power it can handle, and the rest from the PV array goes into storage. In addition, the electric power system 10 can serve to charge batteries of the energy storage subsystem, for example, at night when there is no energy from the PV array available. Additionally, the electric power system 10 can call upon the energy storage subsystem at any time to dispatch energy through the power inverter assembly to the grid, for example, to supplement waning energy output from the PV array, or after sunset when loads on the electric power system 10 are high and the energy is valuable.

The power inverter unit 410B in FIG. 4 can be set to: the third mode in which the power inverter unit 410B is configured to receive the power from the energy storage subsystem 500B and supply the power to the electric power system 10; and the fourth mode in which the power inverter unit 410B is configured to receive the power from the electric power system 10 and supply the power to the energy storage subsystem 500B. Similarly, power inverter units 410C and 410D can be set to: the first mode in which the respective power inverter unit 410C and 410D is configured to receive power from respective solar panel arrangement 20C and 20D and supply the power to the electric power system 10. While power inverter units 410B, 410C, 410D are not configured to operate in each of the first through fourth modes, such power inverter units could be configured in the same manner as power inverter unit 410A if desired in order to allow for operation in any or all of the first through fourth modes.

Figure 5A:
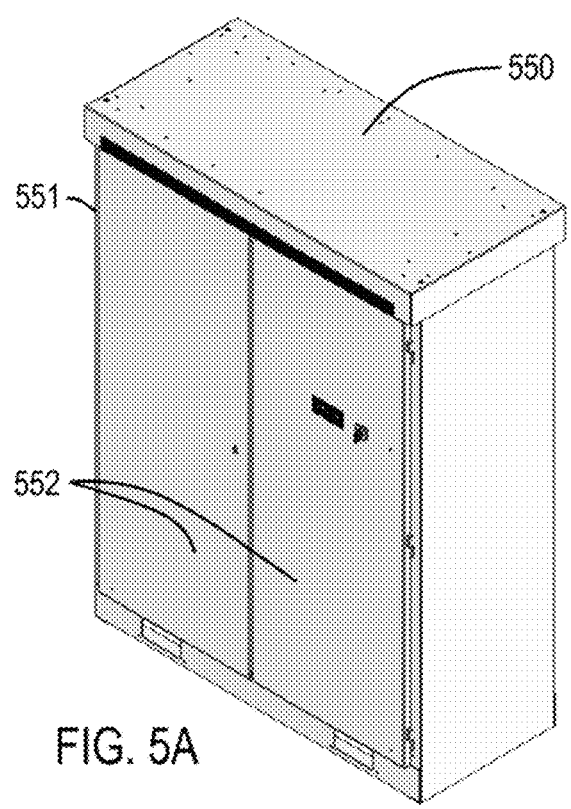
FIG. 5A is a front perspective view of a power inverter unit according to an embodiment thereof.
Figure 5B:
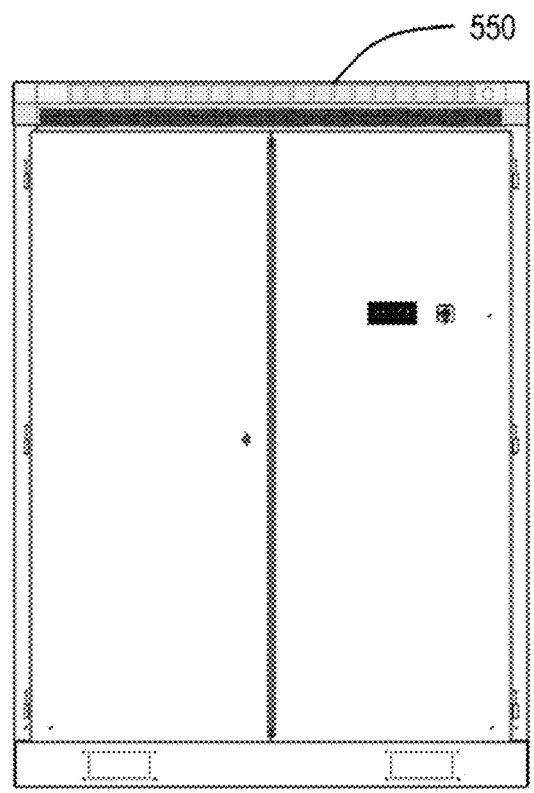
FIG. 5B is a front view of the power inverter unit of FIG. 5A.
Figure 5C:
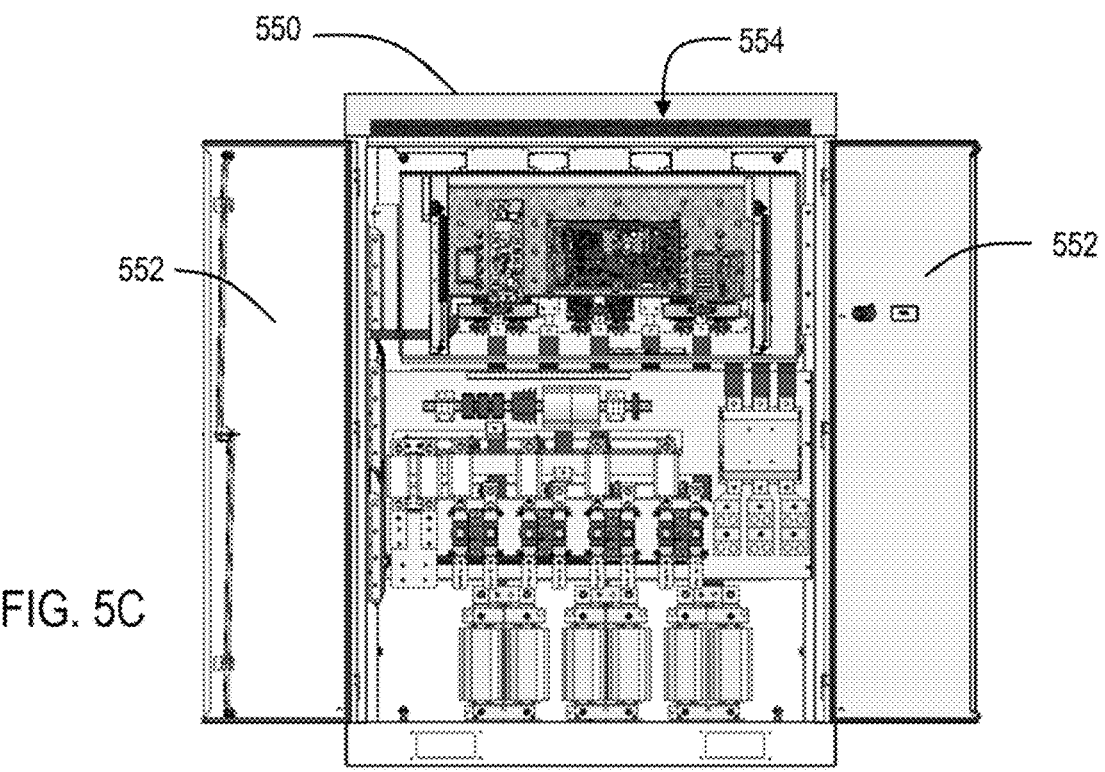
FIG. 5C is a front view of the power inverter unit of FIG. 5A with front doors opened.
Figure 5D:
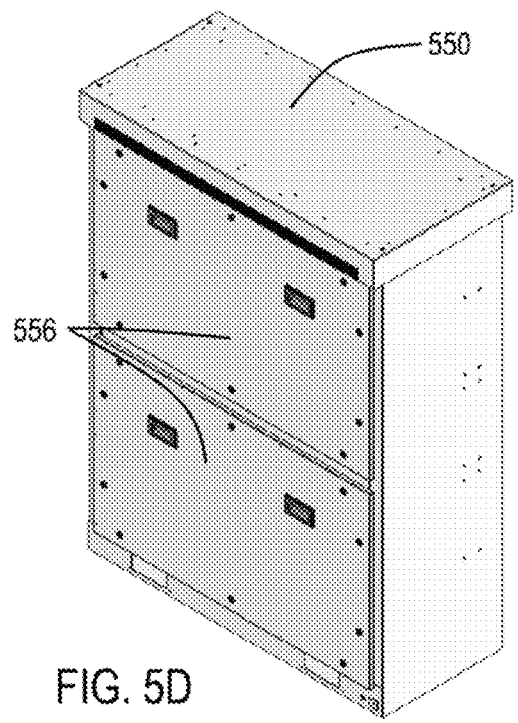
FIG. 5D is a rear perspective view of the power inverter unit of FIG. 5A.
Figure 5E:
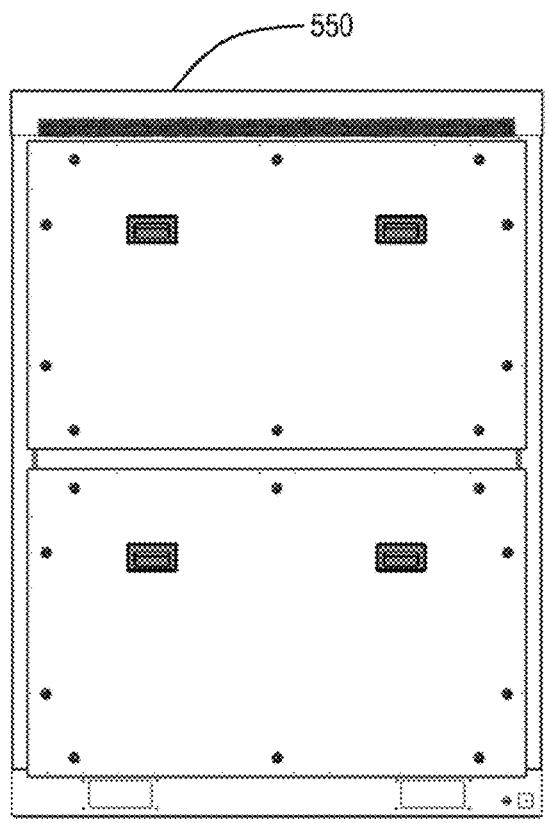
FIG. 5E is a rear view of the power inverter unit of FIG. 5A.
Figure 5F:
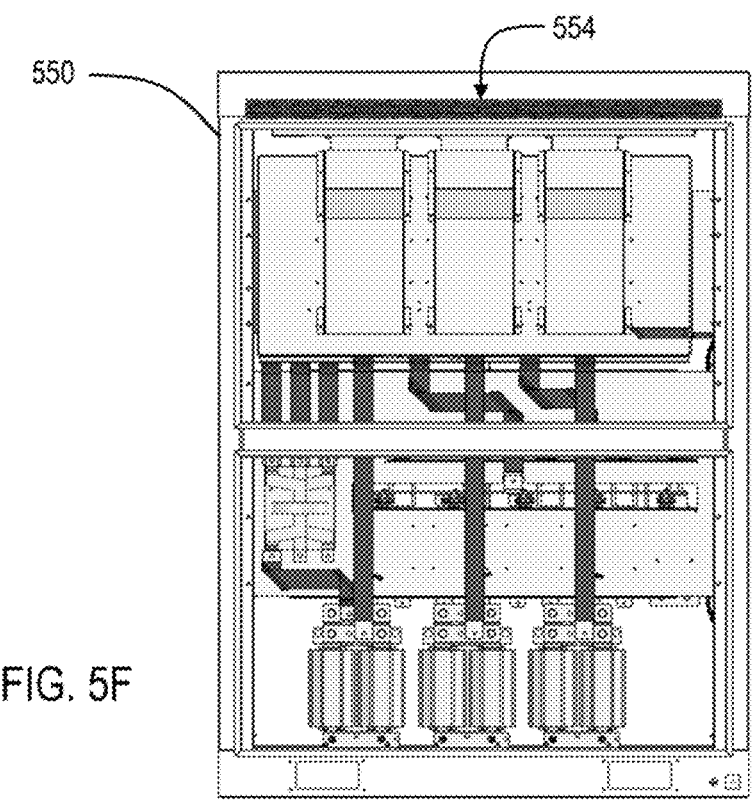
FIG. 5F is a rear view of the power inverter unit of FIG. 5A with rear housing panels removed.

FIG. 5A is a front perspective view of a power inverter unit 550 according to an embodiment thereof. The power inverter unit 550 has a weather-proof or weather-resistant housing 551. The front of the power inverter unit includes two doors 552 that can be opened and closed. FIG. 5B is a front view of the power inverter unit 550 of FIG. 5A. FIG. 5C is a front view of the power inverter unit 550 of FIG. 5A with the front doors 552 opened to expose internal components 554 of the power inverter unit 550. FIG. 5D is a rear perspective view of the power inverter unit 550 of FIG. 5A. The rear of the power inverter unit 550 includes two panels 556 that can be removed and reattached. FIG. 5E is a rear view of the power inverter unit 550 of FIG. 5A. FIG. 5F is a rear view of the power inverter unit 550 of FIG. 5A with rear housing panels 556 removed to expose the internal components 554 of the power inverter unit 550.

Figure 6:
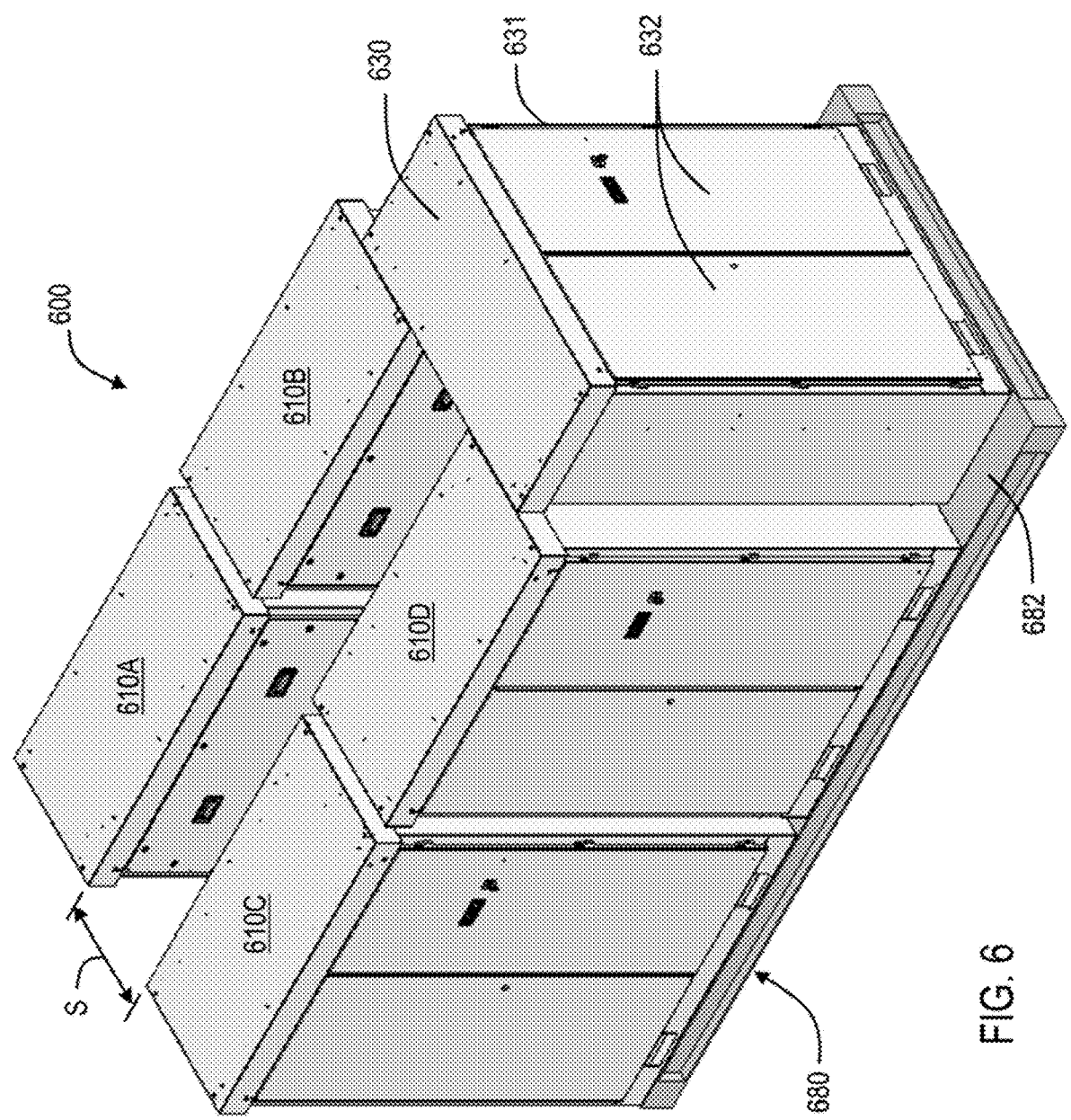
FIG. 6 is a perspective view of a further embodiment of a power inverter assembly having four power inverter units and an AC combiner provided on a portable structural platform.

FIG. 6 is a perspective view of a further embodiment of a power inverter assembly 600 having four power inverter units 610A, 610B, 610C, 610D (each having the same configuration as power inverter unit 550) and an AC combiner 630 provided on a portable structural platform 680. The AC combiner 630 has a weather-proof or weather-resistant housing 631. The power inverter units 610A, 610B, 610C, 610D and the AC combiner 630 are mounted or coupled to an upper mounting surface 682 of the portable structural platform 680 in a rigid manner (e.g., by bolting or welding) such that entire assembly can be easy transported to an operation location. In this embodiment, the power inverter units are provided in two rows (i.e., a first row with units 610A and 610B and a second row with units 610C and 610D) with the rear surfaces of the units of each row facing each other and spaced apart by a distance S to allow a person to access the rear housing panels. In such a configuration, the front doors of the units of each row face outwardly such that the front doors of the units can be easily opened and closed for setup, servicing, and maintenance. In addition, the AC combiner 630 is positioned such that its front doors 632 face outwardly such that the front doors 632 of the AC combiner 630 can be easily opened and closed for setup, servicing, and maintenance.

Figure 7:
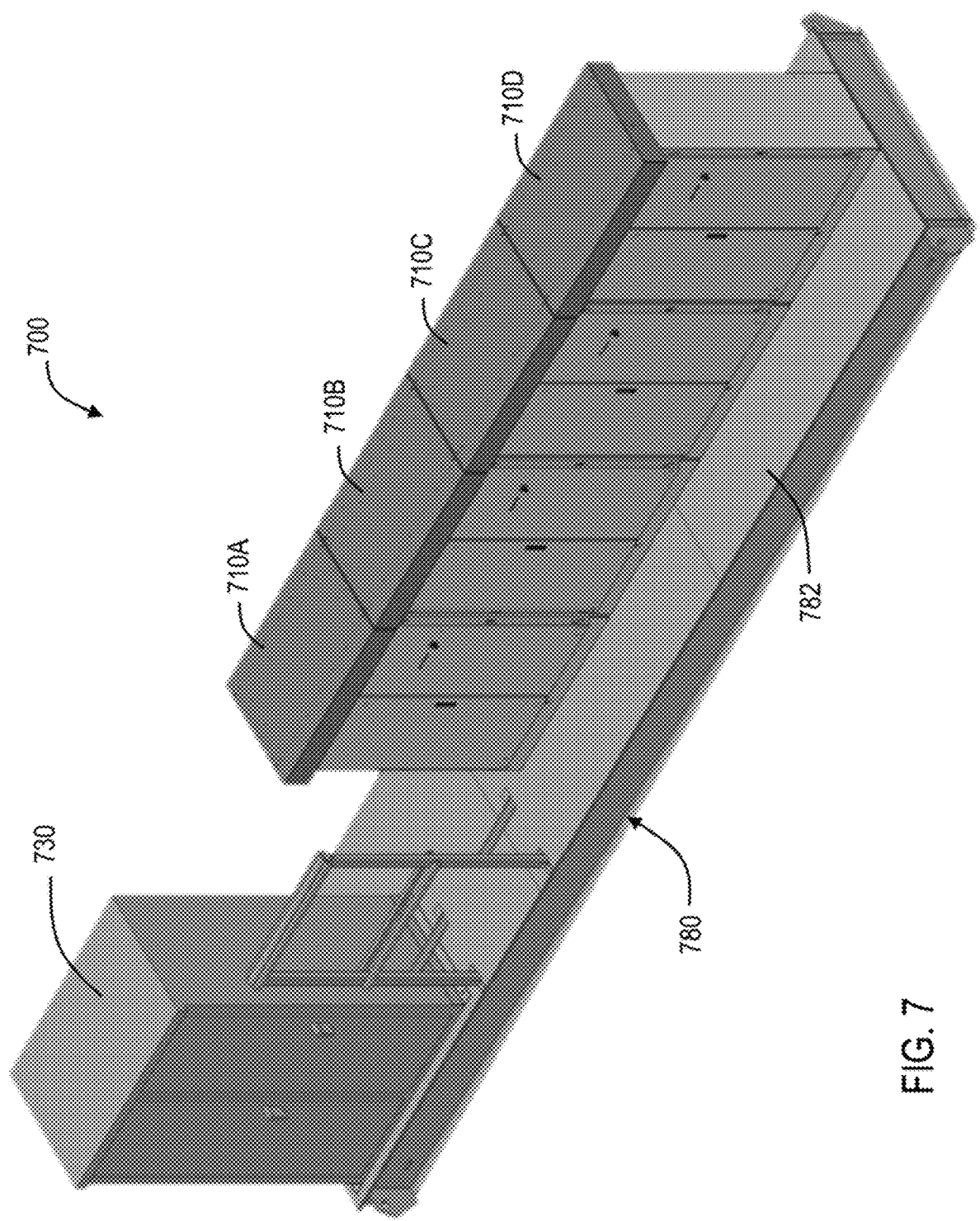
FIG. 7 is a perspective view of a still further embodiment of a power inverter assembly having four power inverter units and an AC combiner provided on a portable structural platform.

FIG. 7 is a perspective view of a still further embodiment of a power inverter assembly 700 having four power inverter units 710A, 710B, 710C, 710D and an AC combiner 730 provided on a portable structural platform 780. The power inverter units 710A, 710B, 710C, 710D and the AC combiner 730 are mounted or coupled to an upper mounting surface 782 of the portable structural platform 780 in a rigid manner such that entire assembly can be easy transported to an operation location. In this embodiment, the power inverter units are provided in a single row, which allows for easy access to front doors and rear panels of each of the power inverter units for setup, servicing, and maintenance. In addition, the AC combiner 730 is positioned such that its front doors and rear panels can be easily accessed for setup, servicing, and maintenance.

Figure 8:
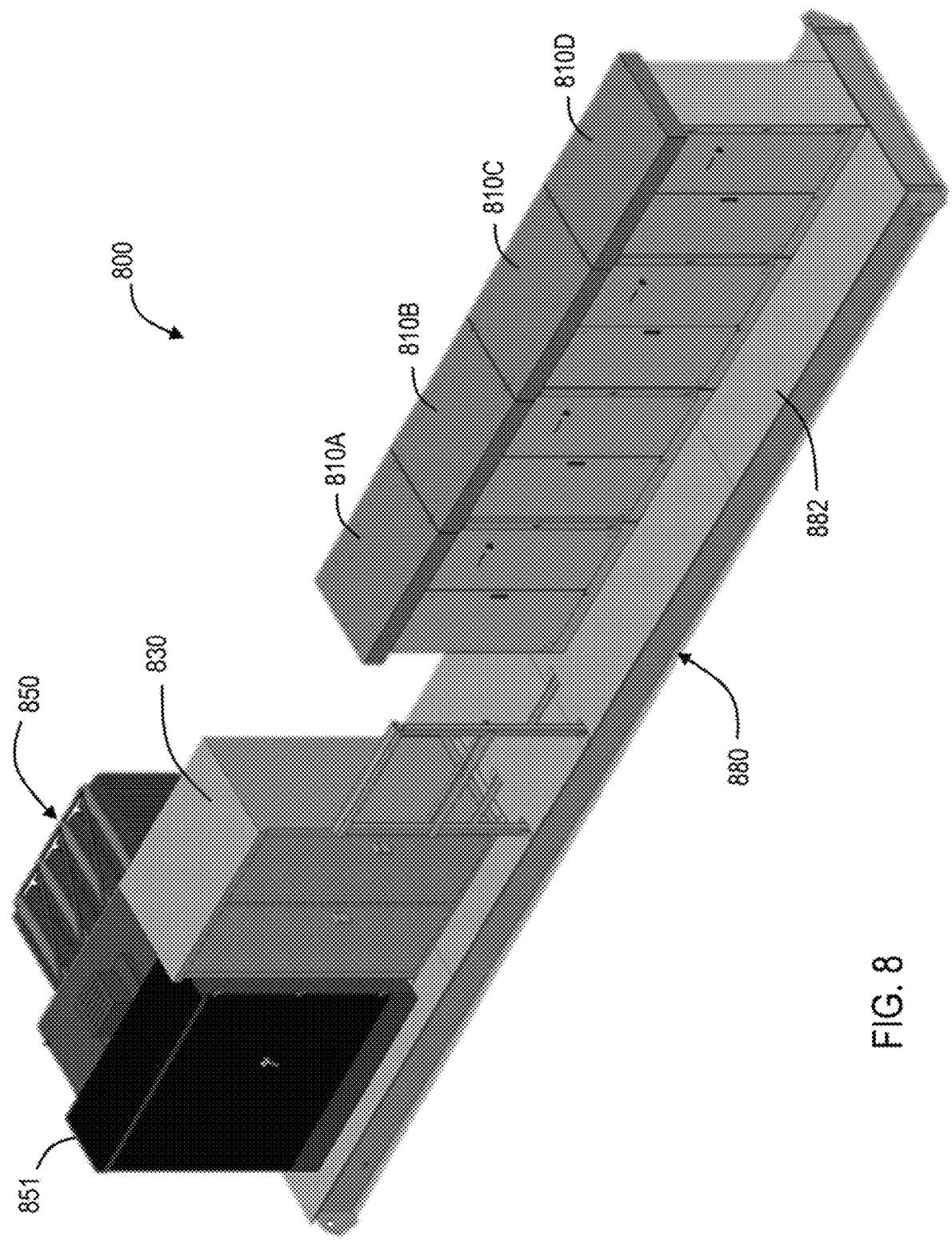
FIG. 8 is a perspective view of a still further embodiment of a power inverter assembly having four power inverter units, an AC combiner, and a transformer provided on a portable structural platform.

FIG. 8 is a perspective view of a still further embodiment of a power inverter assembly 800 having four power inverter units 810A, 810B, 810C, 810D, an AC combiner 830, and a transformer 850 provided on a portable structural platform 880. The transformer 850 has a weather-proof or weather-resistant housing 851. The power inverter units 810A, 810B, 810C, 810D, the AC combiner 830, and the transformer 850 are mounted or coupled to an upper mounting surface 882 of the portable structural platform 880 in a rigid manner such that entire assembly can be easy transported to an operation location. In this embodiment, the power inverter units are provided in a single row, which allows for easy access to front doors and rear panels of each of the power inverter units for setup, servicing, and maintenance. In addition, the AC combiner 830 is positioned such that its front doors and rear panels can be easily accessed for setup, servicing, and maintenance. In addition, the transformer 850 is positioned such that its front doors and rear components can be easily accessed for setup, servicing, and maintenance.

Power inverter assembly disclosed herein provides numerous benefits. The power inverter assembly, with three or four power inverters, for example, can have a combined power rating ranging from 2.2 MW to 4 MW, by utilizing different combinations of three power inverter units with ratings of, for example, 0.75 MW, 0.85 MW and 1 MW. Further, the number of discrete total power levels possible for the power inverter assembly comprising three power inverters, and using different combinations of the three power inverters each with a unique power rating, is 10. The number of discrete total power levels possible for the power inverter assembly comprising four inverters, and using different combinations of three inverters each with a unique power rating, is 15. Utility projects of any size can be served, in increments of power inverter assemblies with these combined power ratings, to achieve a total maximum power output rating required by the project. f it is noted that 1 MW inverters are currently the highest rated power for an inverter that qualifies for the Inflation Reduction Act tax incentive of 1.5 ¢/Wac for US-based inverter manufacturers, and thus the present description focuses on such inverters; however, other higher rated inverters could be utilized as needed.

It is noted that power inverter units, such as 1 MW inverters, when used in the DC-coupled storage configuration, eliminate the requirement for a DC Re-combiner and an AC combiner, thereby saving significant cost compared to DC-coupled storage solutions using String Inverters of lower power rating achieving the same total power rating.

Power inverter assemblies disclosed herein can advantageously utilize one or more models of power inverter units in various combinations in order to produce a multiplicity of different power inverter assembly configurations having various total maximum power output ratings. By establishing a set of models of the power inverter units, each with different and carefully-chosen power ratings (i.e., pre-set AC power ratings), it is possible to create combinations of the power inverter units that result in a large set of power inverter assemblies with total maximum power output ratings equivalent to the Central Inverter class of the Utility segment of the solar market, all with unique power ratings.

A power inverter assembly according to an embodiment herein is a factory assembly of power inverter units on a supporting structural skid (portable structural platform) that may also include an AC combiner and a transformer, pre-wired and pre-tested in the factory. Combining the power inverter units in this way is possible by ensuring that all power inverter units (or models thereof used in selecting the power inverter units for the power inverter assembly) have a same AC Voltage output requirement, allowing them to be combined with a single AC combiner and connected to a single transformer. Given this, different power rating for the power inverter units would be accomplished via firmware and factory settings. Importantly, this approach can be utilized with various models of the power inverter units having no hardware or AC voltage differences among the models. In other words, the power inverter assembly can be constructed using different models of power inverter units, where each of the models have the same hardware configuration, but only differ in programming (e.g. firmware). In mathematical terms, the following equation defines a number of unique power inverter assembly configurations that can be derived using such principles:

$$C = \frac{(N+k-1)!}{k!(N-1)!}$$

where N is the number of models of power inverter units, each with a different power rating, k is the number of power inverter units provided in the power inverter assembly, and C is the number of unique power inverter assembly configurations. A value can be chosen for N so that the resulting combinations of power inverter units, k, provided in a power inverter assembly will result in a set of C unique power inverter assemblies, each with a unique combined power rating.

Figure 9:
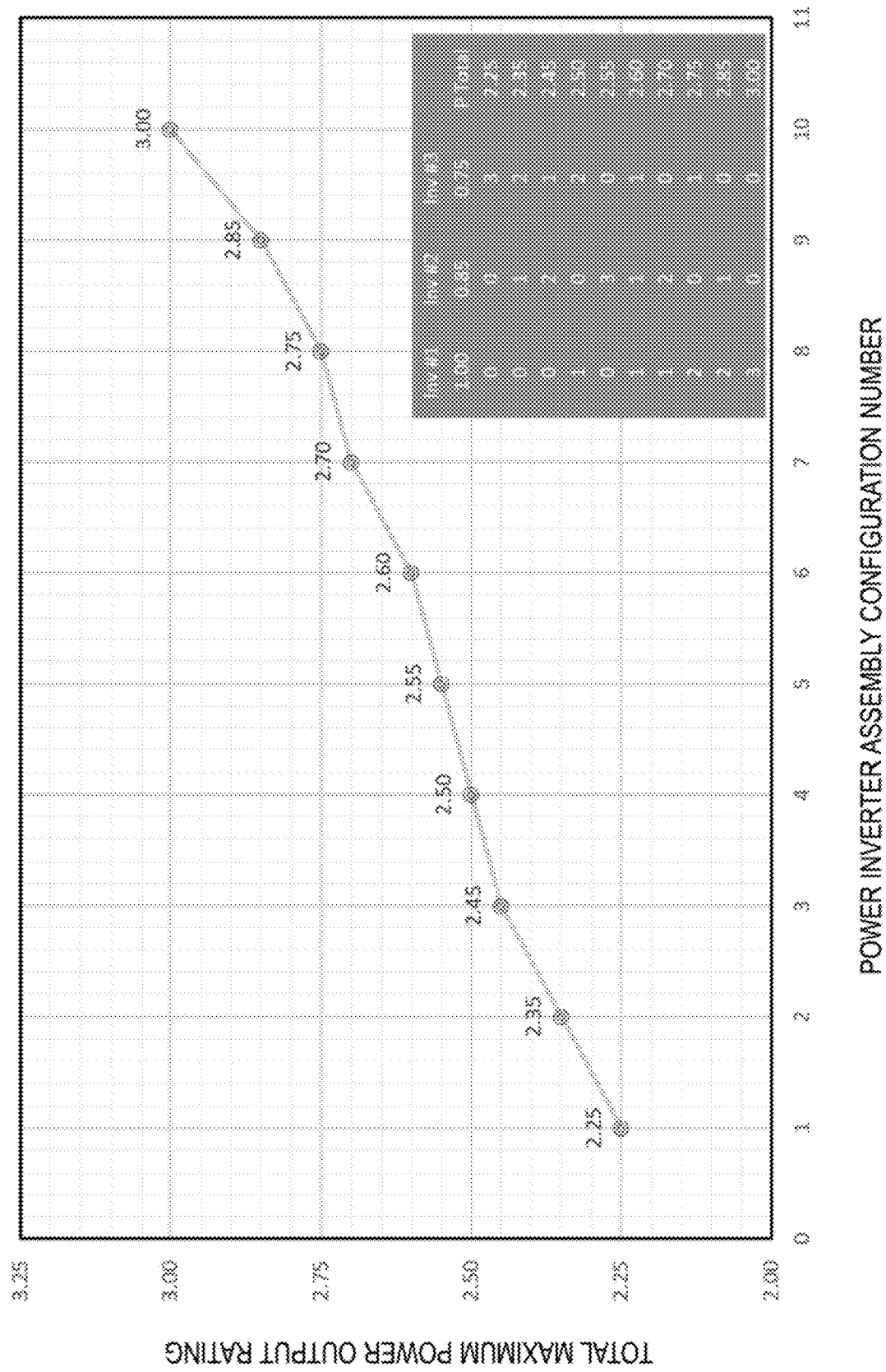
FIG. 9 is a graph showing ten power inverter assembly configurations each having different total maximum power output ratings formulated using three models of power inverter units for a power inverter assembly having three power inverter units.

FIG. 9 is a graph showing ten power inverter assembly configurations each having different total maximum power output ratings formulated using three models of power inverter units for a power inverter assembly having three power inverter units. In the example of FIG. 9, N=3 and k=3, which results in C=10. The three different models (N=3) in FIG. 9 include a power inverter unit with a pre-set AC power rating of 1 MW, a power inverter unit with a pre-set AC power rating of 0.85 MW, and a power inverter unit with a pre-set AC power rating of 0.75 MW, which result in ten different possible power inverter assembly configurations with total maximum power output ratings shown in the graph (i.e., 2.25 MW, 2.35 MW, 2.45 MW, 2.5 MW, 2.55 MW, 2.6 MW, 2.7 MW, 2.75 MW, 2.85 MW, 3 MW). Note the combination of models used to arrive at these values in a box in a lower right side of FIG. 9.

Figure 10:
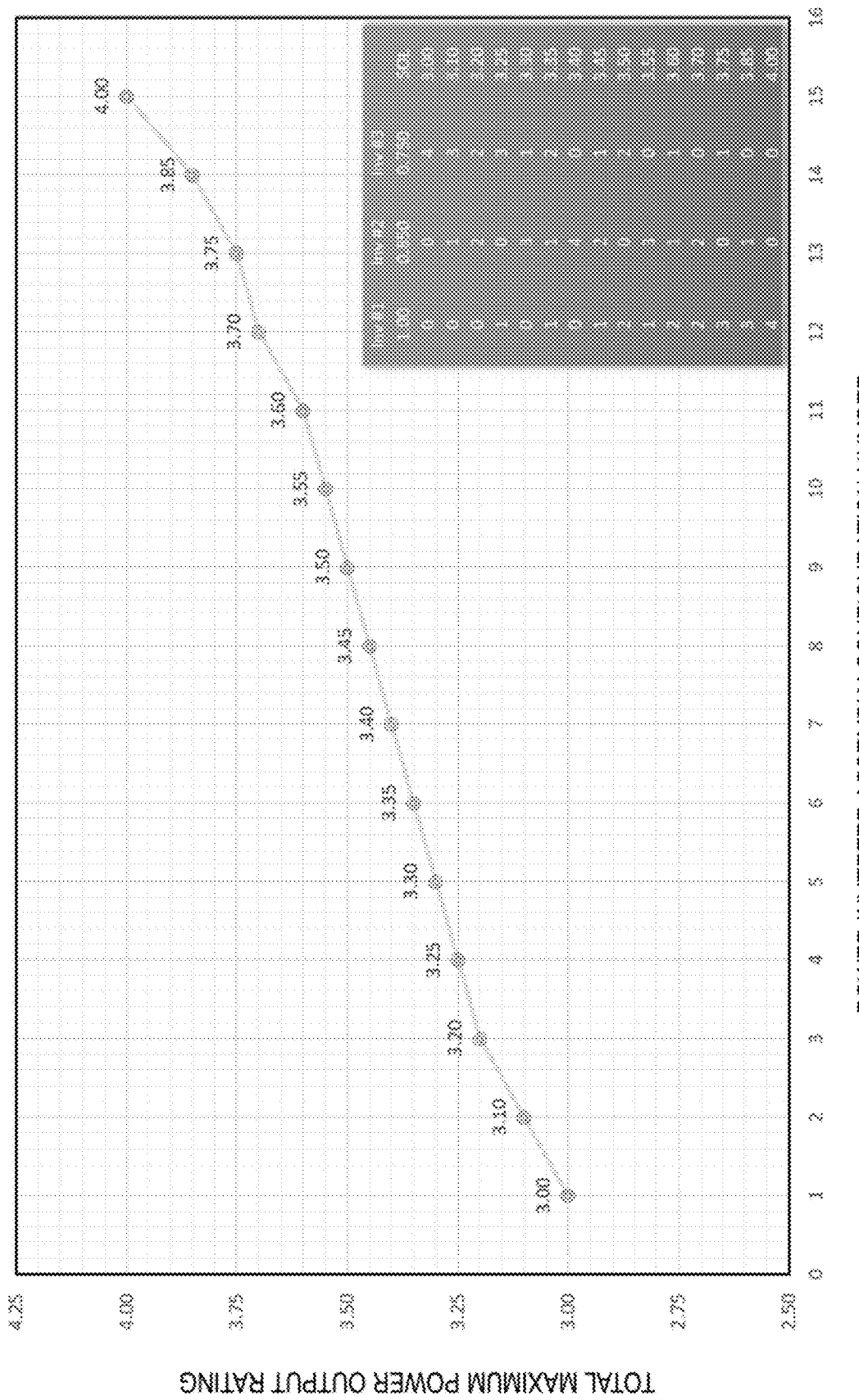
FIG. 10 is a graph showing fifteen power inverter assembly configurations each having different total maximum power output ratings formulated using three models of power inverter units for a power inverter assembly having four power inverter units.

FIG. 10 is a graph showing fifteen power inverter assembly configurations each having different total maximum power output ratings formulated using three models of power inverter units for a power inverter assembly having four power inverter units. In the example of FIG. 10, N=3 and k=4, which results in C=15. The three different models (N=3) in FIG. 10 include a power inverter unit with a pre-set AC power rating of 1 MW, a power inverter unit with a pre-set AC power rating of 0.85 MW, and a power inverter unit with a pre-set AC power rating of 0.75 MW, which result in fifteen different possible power inverter assembly configurations with total maximum power output ratings shown in the graph (i.e., 3 MW, 3.1 MW, 3.2 MW, 3.25 MW, 3.3 MW, 3.35 MW, 3.4 MW, 3.5 MW, 3.55 MW, 3.36 MW, 3.7 MW, 3.75 MW, 3.75 MW, 3.85 MW, 4 MW). Note the combination of models used to arrive at these values in a box in a lower right side of FIG. 10.

Thus, such power inverter assemblies include a set of N power inverter unit models, each with a different power rating, and all with same AC voltage output requirements (for example, all inverters are 3-phase inverters and connect to 3-phase 600 Vac service). A group of k power inverter units are secured to a portable structural platform (or skid) and pre-wired to an AC combiner. Optionally, an output terminal of the AC combiner is pre-wired to a transformer also on the portable structural platform. All components are secured to the portable structural platform, factory pre-assembled and pre-wired, forming a power inverter assembly. Power ratings for the N power inverter unit models are chosen to provide power inverter assemblies having unique combined power ratings. Accordingly, a suite of factory-assembled power inverter assemblies can be offered to customers that have combined power ratings (i.e., total maximum power output ratings) that align well with power ratings needed for utility-scale PV projects.

A method of providing a power inverter assembly is disclosed herein. The method includes selecting a plurality of power inverter units that provide the power inverter assembly with a total maximum power output rating based on a combined total of pre-set AC power ratings of the selected plurality of power inverter units. For example, using the above calculation and the resulting graphs, for example, as shown in FIGS. 9 and 10, the plurality of power inverter units can be selected by finding a combination of power inverter units with a total maximum power output rating based on a combined total of pre-set AC power ratings of the selected plurality of power inverter units. For example, if a total maximum power output rating of 3 MW is needed, then the power inverter assembly can be constructed with three 1.0 MW power inverter units (as shown in FIG. 9), or with four 0.75 MW power inverter units (as shown in FIG. 10). The selected power inverter units can then be coupled to a portable structural platform. The selected plurality of power inverter units preferably each have a first terminal for connection to an electric power system to supply power to an electric power system, a second terminal for connection to one or more solar panel arrangement, and a third terminal for connection to one or more DC energy storage subsystem. Such terminals allow for a variety of connections and/or operating modes.

The selected plurality of power inverter units can be selected from a plurality of models of power inverter units, where the models each have different pre-set AC power ratings. For example, as noted in the above discussions of FIGS. 9 and 10, three different models of power inverter units are considered (i.e., a power inverter unit with a pre-set AC power rating of 1 MW, a power inverter unit with a pre-set AC power rating of 0.85 MW, and a power inverter unit with a pre-set AC power rating of 0.75 MW). Alternatively, the selected plurality of power inverter units can be selected from a plurality of models of power inverter units, where the models each have same pre-set AC power ratings. For example, each of the power inverter units could each have a same pre-set AC power rating, such as 1 MW rating, and power inverter assemblies can be constructed with total maximum power output ratings that incrementally increase by 1 MW (e.g., 2 MW, 3 MW, 4 MW, 5 MW, 6 MW, etc.). As can be seen in the box in the lower right side of FIG. 9 and in the box in the lower right side of FIG. 10, the selected plurality of power inverter units can include: at least two power inverter units of a same model having a same pre-set AC power rating (see, e.g., each configuration in FIG. 9 except 2.6 MW); at least two power inverter units of different models having different pre-set AC power ratings (see, e.g., each configuration in FIG. 9 except 2.25 MW, 2.55 MW, and 3.0 MW); or at least three power inverter units of a mix of same pre-set AC power ratings and different pre-set AC power ratings (see, e.g., each configuration in FIG. 9 except 2.25 MW, 2.55 MW, 2.6 MW, and 3.0 MW).

The disclosure herein can advantageously provide the benefit of a suite of power inverter assemblies with different combined power ratings.

A quantity of C power options can be provided—one for every unique combination of N inverters in sets of k inverters—resulting in a significant advantage in the market, while requiring just N manufactured power inverter units, all of the same hardware construction and differing only in its firmware. For a manufacturer of inverters, this reduces inventory, supply issues, service and support requirements.

The disclosure herein can advantageously provide flexibility to select a power inverter assembly with a combined power rating that aligns optimally with utility-scale PV array building-block sizes, such as power increments associated with single-axis tracker structures of certain fixed lengths and using standard PV array configurations.

The disclosure herein can advantageously provide flexibility to select a power inverter assembly of specific combined power ratings to work optimally with different quantities of PV modules, and PV modules of higher or lower power, including bi-facial PV modules.

The disclosure herein can advantageously provide flexibility to choose specific power inverter unit models for the power inverter assembly to achieve project goals such that all, some, or none of the chosen different power inverter unit can be used for DC-coupled storage, AC-coupled storage, and dedicated PV use.

The combined power ratings for the set of power inverter assemblies would preferably encompass a range of greatest relevance for a building-block of utility-scale PV projects.

A number N of power inverter unit models can be one or more. Preferably, three models of power inverter units are used, such that N=3. The factory-assembled power inverter assembly can include two or more power inverter units, and, preferably, such a power inverter assembly includes three or four power inverter units, such that: k=3 or k=4. A set of ten (N=3, k=3) and a set of fifteen (N=3, k=4) power inverter assemblies with unique power ratings provides an advantageous number of options to the market.

The power ratings for the different models of power inverter units can be broadly selected from any power rating value; however, preferably, power rating values can be multiples of 10 W, with absolute power rating values lying in a range of 500 kW to 1 MW. For example, AC power rating values for three power inverter unit models (N=3) could be 1 MW, 0.85 MW and 0.75 MW, as shown in the examples in FIGS. 9 and 10. A combined power rating for a power inverter assembly could be broadly set; however, preferably a range of 2 MW to 6 MW could be used in order to fall within the utility PV market segment.

The disclosure herein can advantageously provide a large number of possible power inverter assembly configurations that can be constructed using same or different models of power inverter units, where each of the power inverter units have the same hardware configuration (i.e., same bill of materials)(e.g., with different models merely differing in programming (e.g., firmware)).

The number of power inverter units, k, aggregated such as on a factory-assembled portable structural platform to form a power inverter assembly, is not limited, but may be restricted by physical size limits that derive from constraints related to factory-assembly, shipping, and handling of the power inverter assembly.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A power inverter assembly comprising:
   a first power inverter unit configured to receive power from at least one first energy source, the first power inverter unit having a first-first terminal for connection to an electric power system to supply the power to the electric power system, a first-second terminal for connection to a first solar panel arrangement, and a first-third terminal for connection to a first DC energy storage subsystem;
   a second power inverter unit configured to receive power from at least one second energy source, the second power inverter unit having a second-first terminal for connection to the electric power system to supply the power to the electric power system, a second-second terminal for connection to a second solar panel arrangement, and a second-third terminal for connection to a second DC energy storage subsystem; and
   a portable structural platform configured to support the first power inverter unit and the second power inverter unit, the first power inverter unit and the second power inverter unit each being coupled to the portable structural platform,
   wherein the first power inverter unit has a first pre-set AC power rating having a first maximum AC power output value for output to the electric power system and the second power inverter unit has a second pre-set AC power rating having a second maximum AC power output value for output to the electric power system in order to provide the power inverter assembly with a total maximum power output rating based on a combined total of the first pre-set AC power rating and the second pre-set AC power rating,
   wherein the power inverter assembly is a factory assembly of the first power inverter unit and the second power inverter unit coupled to the portable structural platform,
   wherein the at least one first energy source is one or more first energy source including:
   the electric power system;
   the first solar panel arrangement; and
   the first DC energy storage subsystem, and
   wherein the at least one second energy source is one or more second energy source including:
   the electric power system;
   the second solar panel arrangement; and
   the second DC energy storage subsystem.

2. The power inverter assembly according to claim 1, wherein the first pre-set AC power rating and the second pre-set AC power rating are each set at one of:
   1 MW;
   0.85 MW; and
   0.75 MW.

3. The power inverter assembly according to claim 1, further comprising:
   an AC combiner supported by the structural support,
   wherein the first-first terminal of the first power inverter unit is connected to the AC combiner,
   wherein the second-first terminal of the second power inverter unit is connected to the AC combiner, and
   wherein the AC combiner includes a terminal for connection to the electric power system.

4. The power inverter assembly according to claim 3, further comprising:
   a transformer supported by the structural support,
   wherein the terminal of the AC combiner is connected to the transformer, and
   wherein the transformer includes a terminal for connection to the electric power system.

5. The power inverter assembly according to claim 1, further comprising:
   a third power inverter unit configured to receive power from at least one third energy source, the third power inverter unit having a third-first terminal for connection to the electric power system to supply the power to the electric power system, a third-second terminal for connection to a third solar panel arrangement, and a third-third terminal for connection to a third DC energy storage subsystem,
wherein the portable structural platform is configured to support the third power inverter unit, the third power inverter unit being coupled to the portable structural platform, and
wherein the third power inverter unit has a third pre-set AC power rating having a third maximum AC power output value for output to the electric power system in order to provide the power inverter assembly with the total maximum power output rating to the electric power system based on the combined total of the first pre-set AC power rating, the second pre-set AC power rating, and the third pre-set AC power rating.

6. The power inverter assembly according to claim 1, wherein the first power inverter unit includes at least one first processor programmed to provide the first power inverter unit with the first pre-set AC power rating, and
wherein the second power inverter unit includes at least one second processor programmed to provide the second power inverter unit with the second pre-set AC power rating.

7. The power inverter assembly according to claim 1, wherein the first pre-set AC power output value is different from the second pre-set AC power output value.

8. The power inverter assembly according to claim 7, wherein the first power inverter unit has a same hardware configuration as the second power inverter unit.

9. The power inverter assembly according to claim 1, wherein the factory assembly is wired and tested at a factory prior to being transported to an operation location.

10. The power inverter assembly according to claim 1, wherein the first power inverter unit and the second power inverter unit each have a same AC voltage output requirement.

11. The power inverter assembly according to claim 1, further comprising:
at least one processor programmed to set the first power inverter unit to:
a first mode in which the first power inverter unit is configured to receive the power from the first solar panel arrangement and supply the power to the electric power system;
a second mode in which the first power inverter unit is configured to receive the power from the first solar panel arrangement and supply the power to the first DC energy storage subsystem;
a third mode in which the first power inverter unit is configured to receive the power from the first DC energy storage subsystem and supply the power to the electric power system; and
a fourth mode in which the first power inverter unit is configured to receive the power from the electric power system and supply the power to the first DC energy storage subsystem.

12. A method of providing a power inverter assembly, the method comprising:
providing a first power inverter unit configured to receive power from at least one first energy source, the first power inverter unit having a first-first terminal for connection to an electric power system to supply the power to the electric power system, a first-second terminal for connection to a first solar panel arrangement, and a first-third terminal for connection to a first DC energy storage subsystem;
providing a second power inverter unit configured to receive power from at least one second energy source, the second power inverter unit having a second-first terminal for connection to the electric power system to supply the power to the electric power system, a second-second terminal for connection to a second solar panel arrangement, and a second-third terminal for connection to a second DC energy storage subsystem; and
coupling the first power inverter unit and the second power inverter unit to a portable structural platform configured to support the first power inverter unit and the second power inverter unit,
wherein the first power inverter unit has a first pre-set AC power rating having a first maximum AC power output value for output to the electric power system and the second power inverter unit has a second pre-set AC power rating having a second maximum AC power output value for output to the electric power system in order to provide the power inverter assembly with a total maximum power output rating based on a combined total of the first pre-set AC power rating and the second pre-set AC power rating, and
wherein the power inverter assembly is a factory assembly of the first power inverter unit and the second power inverter unit coupled to the portable structural platform.

13. The method according to claim 12, further comprising:
coupling an AC combiner to the structural support, the first-first terminal of the first power inverter unit being connected to the AC combiner, the second-first terminal of the second power inverter unit being connected to the AC combiner, the AC combiner including a terminal for connection to the electric power system; and
coupling a transformer to the structural support, the terminal of the AC combiner being connected to the transformer, the transformer including a terminal for connection to the electric power system.

14. The method according to claim 12, further comprising:
providing a third power inverter unit configured to receive power from at least one third energy source, the third power inverter unit having a third-first terminal for connection to the electric power system to supply the power to the electric power system, a third-second terminal for connection to a third solar panel arrangement, and a third-third terminal for connection to a third DC energy storage subsystem; and
coupling the third power inverter unit to the portable structural platform, the portable structural platform being configured to support the third power inverter unit,
wherein the third power inverter unit has a third pre-set AC power rating having a third maximum AC power output value for output to the electric power system in order to provide the power inverter assembly with the total maximum power output rating to the electric power system based on the combined total of the first pre-set AC power rating, the second pre-set AC power rating, and the third pre-set AC power rating.

15. The method according to claim 12,
wherein the first pre-set AC power output value is different from the second pre-set AC power output value, and
wherein the first power inverter unit has a same hardware configuration as the second power inverter unit.

16. The method according to claim 12, wherein the factory assembly is wired and tested at a factory prior to being transported to an operation location.

17. The method according to claim 12, further comprising:
providing at least one processor programmed to set the first power inverter unit to:
  a first mode in which the first power inverter unit is configured to receive the power from the first solar panel arrangement and supply the power to the electric power system;
  a second mode in which the first power inverter unit is configured to receive the power from the first solar panel arrangement and supply the power to the first DC energy storage subsystem;
  a third mode in which the first power inverter unit is configured to receive the power from the first DC energy storage subsystem and supply the power to the electric power system; and
  a fourth mode in which the first power inverter unit is configured to receive the power from the electric power system and supply the power to the first DC energy storage subsystem.

18. A method of providing a power inverter assembly, the method comprising:
selecting a plurality of power inverter units that provide the power inverter assembly with a total maximum power output rating based on a combined total of pre-set AC power ratings of the selected plurality of power inverter units; and
coupling the selected plurality of power inverter units to a portable structural platform,
wherein the selected plurality of power inverter units each have:
  a first terminal for connection to an electric power system to supply power to an electric power system,
  a second terminal for connection to a respective solar panel arrangement, and
  a third terminal for connection to a respective DC energy storage subsystem, and
wherein the power inverter assembly is a factory assembly of the plurality of inverter units coupled to the portable structural platform.

19. The method according to claim 18, wherein the selected plurality of power inverter units are selected from a plurality of models of power inverter units, the models each having different pre-set AC power ratings.

20. The method according to claim 18, wherein the selected plurality of power inverter units include:
at least two power inverter units of a same model having a same pre-set AC power rating;
at least two power inverter units of different models having different pre-set AC power ratings; or
at least three power inverter units of a mix of same pre-set AC power ratings and different pre-set AC power ratings.

* * * * *